US012679672B2

(12) United States Patent
Prasad et al.

(10) Patent No.: US 12,679,672 B2
(45) Date of Patent: Jul. 14, 2026

(54) SUBSTRATE CARRIER

(71) Applicant: Applied Materials, Inc., Santa Clara, CA (US)

(72) Inventors: Bhaskar Prasad, Jamshedpur (IN); Thomas Brezoczky, Los Gatos, CA (US); Kirankumar Neelasandra Savandaiah, Bangalore (IN); Aditya Kumar, Bangalore (IN); Vijet Patil, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/417,510

(22) Filed: Jan. 19, 2024

(65) Prior Publication Data

US 2025/0236473 A1 Jul. 24, 2025

(51) Int. Cl.
*B65G 54/02* (2006.01)

(52) U.S. Cl.
CPC ...... *B65G 54/02* (2013.01); *B65G 2201/0297* (2013.01)

(58) Field of Classification Search
None
See application file for complete search history.

(56) References Cited

U.S. PATENT DOCUMENTS

| | | | |
|---|---|---|---|
| 5,180,048 A | 1/1993 | Kawada et al. | |
| 5,569,350 A | 10/1996 | Osada et al. | |
| 5,641,054 A | 6/1997 | Mori et al. | |
| 6,157,106 A | 12/2000 | Tietz et al. | |
| 6,206,176 B1 | 3/2001 | Blonigan et al. | |
| 6,231,716 B1 | 5/2001 | White et al. | |

(Continued)

FOREIGN PATENT DOCUMENTS

| | | |
|---|---|---|
| CN | 101158852 A | 4/2008 |
| CN | 113707585 A | 11/2021 |

(Continued)

OTHER PUBLICATIONS

U.S. Appl. No. 18/081,493, filed Dec. 14, 2022.

(Continued)

*Primary Examiner* — Gene O Crawford
*Assistant Examiner* — Muhammad Awais
(74) *Attorney, Agent, or Firm* — Patterson + Sheridan, LLP

(57) ABSTRACT

Embodiments of the present disclosure relate to substrate transfer systems, including the use of a carrier configured to transfer objects through a substrate processing system. The carrier generally includes a base, a first magnetic levitation element and a second magnetic levitation element coupled to the base. The first magnetic levitation element and the second magnetic levitation element may be aligned in a first direction, the first magnetic levitation element may include a first array of features, and the second magnetic levitation element may include a second array of features. The carrier may also include a first support member coupled to the base and a second support member coupled to the base. The first support member and the second support member are disposed below the first magnetic levitation element and the second magnetic levitation element, and the first support member and the second support member are configured to support an object.

18 Claims, 9 Drawing Sheets

(56) References Cited

U.S. PATENT DOCUMENTS

| | | | |
|---|---|---|---|
| 7,293,950 | B2 | 11/2007 | Bonora et al. |
| 7,438,175 | B2 | 10/2008 | White et al. |
| 7,841,820 | B2 | 11/2010 | Bonora et al. |
| 7,948,122 | B2 | 5/2011 | Compter et al. |
| 7,964,038 | B2 | 6/2011 | Patalay et al. |
| 7,994,486 | B2 | 8/2011 | Smick et al. |
| 8,104,951 | B2 | 1/2012 | Aderhold et al. |
| 8,851,817 | B2 | 10/2014 | Bonora et al. |
| 9,390,950 | B2 | 7/2016 | Sorabji et al. |
| 9,588,443 | B2 | 3/2017 | Shibazaki |
| 9,964,863 | B1 | 5/2018 | Babayan et al. |
| 10,204,810 | B2 | 2/2019 | Hoey et al. |
| 10,236,197 | B2 | 3/2019 | Janakiraman et al. |
| 10,256,124 | B2 | 4/2019 | Mooring |
| 10,262,887 | B2 | 4/2019 | Hao et al. |
| 10,283,397 | B2 | 5/2019 | Willwerth et al. |
| 10,460,977 | B2 | 10/2019 | Breninger et al. |
| 10,483,141 | B2 | 11/2019 | Janakiraman et al. |
| 10,490,436 | B2 | 11/2019 | Ghosh et al. |
| 10,734,265 | B2 | 8/2020 | Janakiraman et al. |
| 10,770,337 | B2 | 9/2020 | Lee et al. |
| 10,784,142 | B2 | 9/2020 | Marcelynas et al. |
| 10,851,453 | B2 | 12/2020 | Tsai et al. |
| 10,892,180 | B2 | 1/2021 | Chia et al. |
| 11,232,965 | B2 | 1/2022 | Newman et al. |
| 11,377,310 | B2 | 7/2022 | Aust et al. |
| 11,508,595 | B2 | 11/2022 | Aust et al. |
| 11,527,424 | B2 | 12/2022 | Berger et al. |
| 11,774,864 | B2 | 10/2023 | Aoki |
| 2002/0018842 | A1 | 2/2002 | Dunlow |
| 2002/0108842 | A1* | 8/2002 | Bonora ................. B65G 13/04 |
| | | | 198/836.1 |
| 2003/0178145 | A1 | 9/2003 | Anderson et al. |
| 2003/0219977 | A1 | 11/2003 | Pomarede et al. |
| 2004/0023495 | A1 | 2/2004 | Butterfield et al. |
| 2004/0058293 | A1 | 3/2004 | Nguyen et al. |
| 2004/0255442 | A1 | 12/2004 | McDiarmid et al. |
| 2006/0102078 | A1 | 5/2006 | Fairbairn et al. |
| 2006/0156981 | A1 | 7/2006 | Fondurulia et al. |
| 2007/0160507 | A1 | 7/2007 | Satoh et al. |
| 2007/0269297 | A1 | 11/2007 | Meulen et al. |
| 2008/0175694 | A1 | 7/2008 | Park et al. |
| 2008/0232947 | A1 | 9/2008 | van der Meulen et al. |
| 2008/0266037 | A1 | 10/2008 | Williams |
| 2009/0314211 | A1 | 12/2009 | Du Bois et al. |
| 2010/0062592 | A1 | 3/2010 | Clark |
| 2010/0136773 | A1 | 6/2010 | Akae et al. |
| 2010/0226737 | A1 | 9/2010 | Sakaue et al. |
| 2011/0312189 | A1 | 12/2011 | Kim et al. |
| 2012/0109355 | A1 | 5/2012 | Baccini et al. |
| 2012/0213614 | A1 | 8/2012 | Bonora et al. |
| 2012/0249291 | A1 | 10/2012 | Holcomb et al. |
| 2013/0171757 | A1 | 7/2013 | Ponnekanti et al. |
| 2014/0020629 | A1 | 1/2014 | Tsai et al. |
| 2018/0339816 | A1 | 11/2018 | Oldendorf et al. |
| 2018/0374732 | A1 | 12/2018 | Klein et al. |
| 2019/0348264 | A1 | 11/2019 | Tsai et al. |
| 2019/0368024 | A1* | 12/2019 | Heymanns ........ H01L 21/67712 |
| 2020/0026060 | A1 | 1/2020 | Takato |
| 2020/0083452 | A1* | 3/2020 | Heymanns ........... H10K 71/191 |
| 2020/0194293 | A1* | 6/2020 | Himeji ................ H10P 72/0608 |
| 2020/0232088 | A1 | 7/2020 | White et al. |
| 2020/0262060 | A1 | 8/2020 | Hosek et al. |
| 2020/0262660 | A1 | 8/2020 | Hosek et al. |
| 2020/0381276 | A1 | 12/2020 | Yedla et al. |
| 2021/0024929 | A1 | 1/2021 | Yokota et al. |
| 2021/0249291 | A1 | 8/2021 | Raatz et al. |
| 2021/0265188 | A1 | 8/2021 | Moura et al. |
| 2021/0296150 | A1 | 9/2021 | Berger et al. |
| 2021/0328146 | A1 | 10/2021 | Heymanns et al. |
| 2021/0354934 | A1* | 11/2021 | Aust ..................... H01L 21/677 |
| 2022/0003718 | A1 | 1/2022 | Watanabe |
| 2022/0013383 | A1 | 1/2022 | Savandaiah et al. |
| 2022/0037181 | A1 | 2/2022 | Hatano et al. |
| 2022/0130700 | A1 | 4/2022 | Newman et al. |

| | | | |
|---|---|---|---|
| 2022/0208426 | A1* | 6/2022 | Aust ................... C23C 16/4587 |
| 2022/0293451 | A1 | 9/2022 | Sulyman et al. |
| 2022/0293452 | A1 | 9/2022 | Sulyman et al. |
| 2022/0336258 | A1 | 10/2022 | Srivastava et al. |
| 2022/0393618 | A1 | 12/2022 | Aust et al. |
| 2022/0415635 | A1 | 12/2022 | Yedla et al. |
| 2022/0415687 | A1 | 12/2022 | Hatano et al. |
| 2022/0415688 | A1 | 12/2022 | Hatano et al. |
| 2023/0132174 | A1 | 4/2023 | Thanu et al. |

FOREIGN PATENT DOCUMENTS

| | | | | | |
|---|---|---|---|---|---|
| DE | 102018006259 | A1 | 12/2019 | | |
| EP | 1681261 | A1 | 7/2006 | | |
| EP | 4222779 | A1 | 8/2023 | | |
| JP | 62121134 | A | 6/1987 | | |
| JP | H06324297 | A | 11/1994 | | |
| JP | 2023121377 | A | * 8/2023 | ........... H10K 71/166 |
| KR | 10-20210081597 | A | 7/2021 | | |
| KR | 20220099611 | A | * 7/2022 | ........ H01L 21/67712 |
| KR | 1020220099611 | A | 7/2022 | | |
| TW | D187001 | S | 12/2017 | | |
| TW | 202141675 | A | 11/2021 | | |
| TW | D215155 | S | 11/2021 | | |
| WO | 2008077048 | A2 | 6/2008 | | |
| WO | 2011102410 | A1 | 8/2011 | | |
| WO | 2015007385 | A1 | 1/2015 | | |
| WO | 2015043712 | A1 | 4/2015 | | |
| WO | 2015140155 | A1 | 9/2015 | | |
| WO | 2015158725 | A1 | 10/2015 | | |
| WO | 2015162177 | A1 | 10/2015 | | |
| WO | 2015189263 | A1 | 12/2015 | | |
| WO | 2016162288 | A1 | 10/2016 | | |
| WO | 2019037858 | A1 | 2/2019 | | |
| WO | WO-2019052657 | A1 | * 3/2019 | ........... H10P 72/3218 |
| WO | 2019145035 | A1 | 8/2019 | | |
| WO | 2019238416 | A1 | 12/2019 | | |
| WO | 2020126040 | A1 | 6/2020 | | |
| WO | 2020192911 | A1 | 10/2020 | | |
| WO | 2021106796 | A1 | 6/2021 | | |
| WO | 2021106799 | A1 | 6/2021 | | |
| WO | 2021223843 | A1 | 11/2021 | | |
| WO | 2022044834 | A1 | 3/2022 | | |

OTHER PUBLICATIONS

U.S. Appl. No. 18/141,909, filed May 1, 2023.
U.S. Appl. No. 18/141,914, filed May 1, 2023.
U.S. Appl. No. 18/141,920, filed May 1, 2023.
U.S. Appl. No. 18/141,923, filed May 1, 2023.
U.S. Appl. No. 18/141,926, filed May 1, 2023.
U.S. Appl. No. 18/141,931, filed May 1, 2023.
China Office Action issued to patent application No. 202430235945.6 on Oct. 17, 2025.
International Search Report/ Written Opinion issued to PCT/US2025/011153 on Apr. 29, 2025.
International Search Report and Written Opinion in related application PCT/US2023/035709 dated Feb. 5, 2024.
International Search Report/ Written Opinion issued to PCT/US2023/079455 on Mar. 6, 2024.
Yu et al.; Controller design and implementation of six-degree-of-freedom magnetically levitated positioning system with high precision; Proc. IMechE vol. 222 Part I: J. Systems and Control Engineering; 12 pages.
Zhu et al; Design and Control of a Six Degrees-of-Freedom Magnetically Levitated Positioning System; IFAC PapersOnLine 49-21 (2016) pp. 127-132.
Temposonics; Sensor Selector Guide; Retrieved from the Internet at: <https://www.temposonics.com/docs/temposonicslibraries/literature/sensor_selector_guide_industrial_551814_en.pdf?sfvrsn=5fde8874_12>; 21 pages.
Linear Motion Tips; How do Magnettostrictive sensors work ?; Retrieved from the Internet at: <https://www.linearmotiontips.com/how-do-magnetostrictive-sensors-work/> 9 Pages.

(56) References Cited

OTHER PUBLICATIONS

Taiwan Office Action issued to patent application No. 113301860 on
Nov. 7, 2024.

* cited by examiner

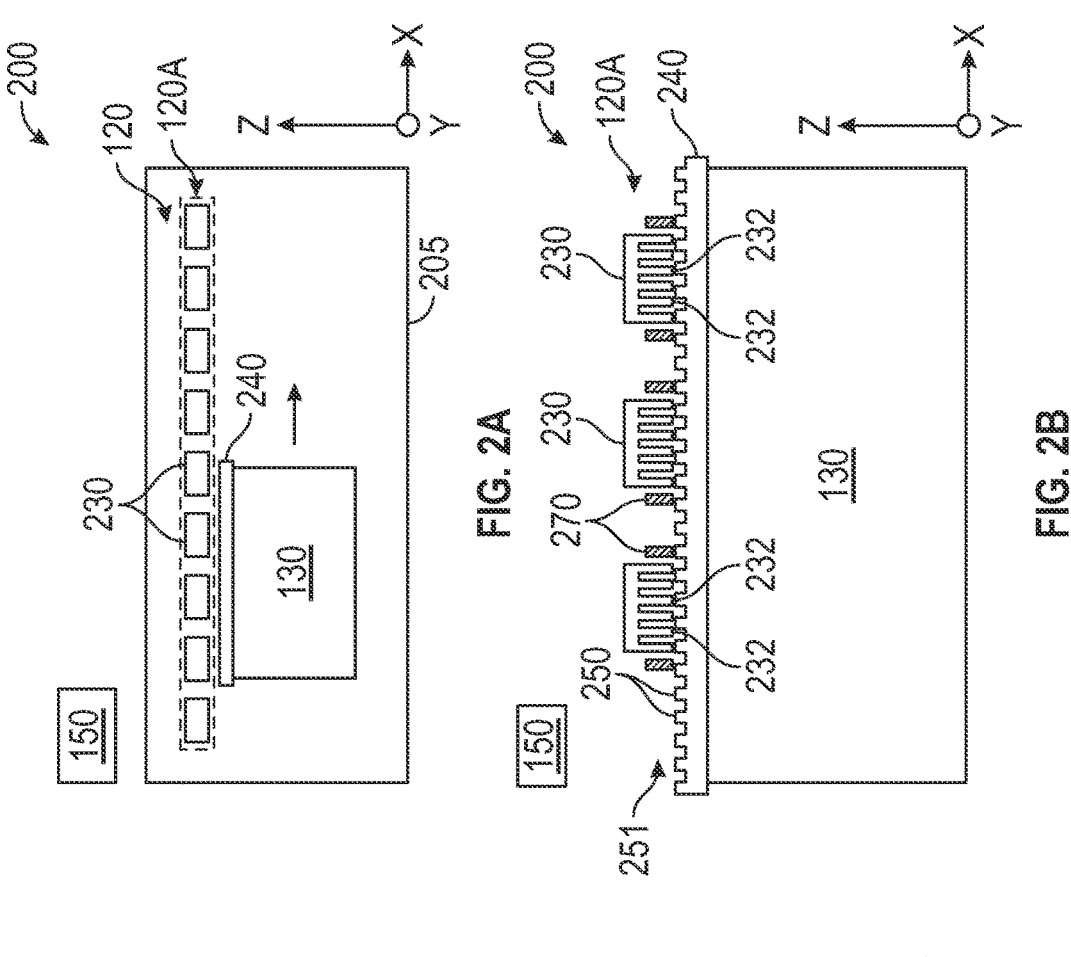
FIG. 2A
FIG. 2B
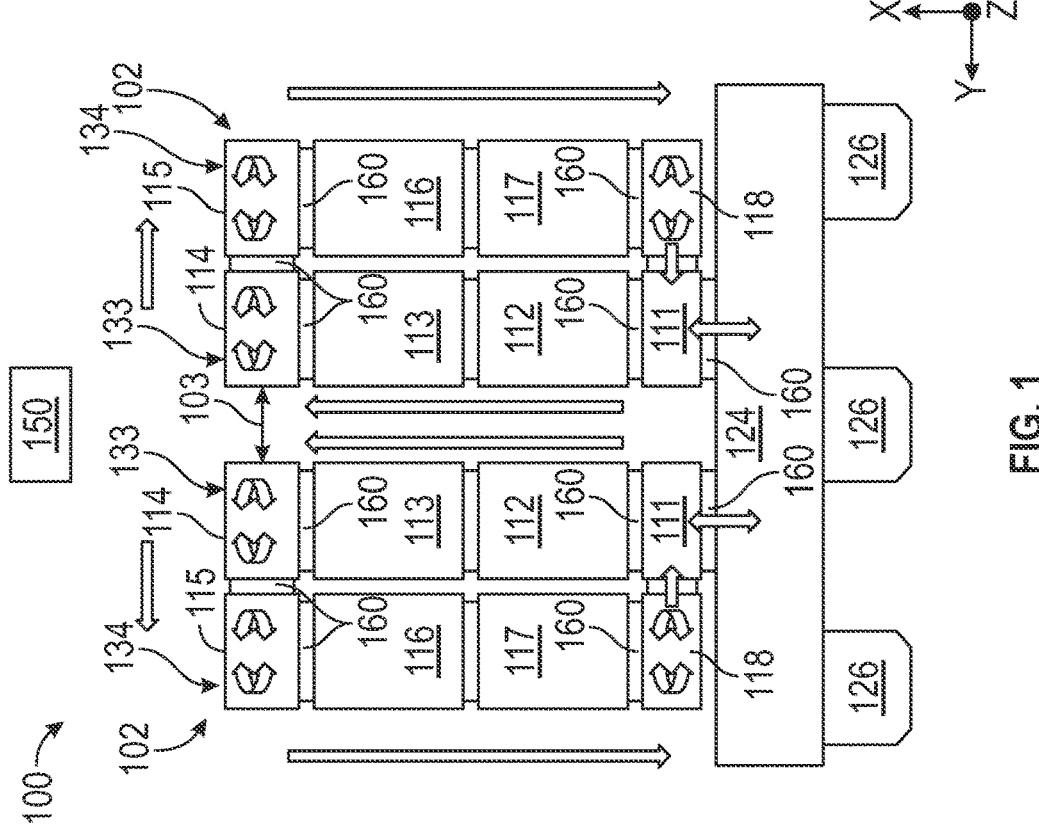
FIG. 1

SUBSTRATE CARRIER

BACKGROUND

Field

Embodiments described herein generally relate to semiconductor processes and, more particularly, to semiconductor process equipment used to convey semiconductor substrates.

Description of the Related Art

Semiconductor devices are typically formed on semiconductor substrates using processing systems which include several process chambers, where each process chamber is used to complete one or more of the various steps (e.g., depositions) to form the semiconductor devices (e.g., a memory chip). Processing systems may use substrate transfer systems to move substrates between each of the process chambers. The process chambers and the substrate transfer system of the processing system may each be held at vacuum during processing. Substrate transfer systems may utilize a carrier to move the substrates through and between each of the process chambers. However, precise, reliable, and smooth transportation of the substrates into and out of each of the process chambers during the various steps used to form semiconductor devices may be challenging. For example, it is desirable that carriers have favorable dimensions and preferably be able to transport substrates without negatively impacting the various activities used to form semiconductor devices. In addition, it is preferable that carrier manufacturing process are not overly complicated and that manufacturing costs are not too expensive. Further, it is important that carriers are versatile, including being able to handle common failures during transportation and adaptable to fulfill a variety of duties in processing systems.

Accordingly, there exists a need for further improvements in substrate transfer mechanisms that include substrate carriers to overcome various challenges above.

SUMMARY

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

Embodiments provided herein generally include a carrier configured to support and transfer objects through a substrate processing system.

Embodiments of the present disclosure include a carrier. The carrier generally includes a base, a first magnetic levitation element and a second magnetic levitation element coupled to the base. The first magnetic levitation element and the second magnetic levitation element may be aligned in a first direction, the first magnetic levitation element may include a first array of features, and the second magnetic levitation element may include a second array of features. The first array of features and the second array of features may each include a ferromagnetic material. The first array of features and the second array of features may be a linear array of features that are aligned in the first direction. The carrier also generally includes a first support member coupled to the base and a second support member coupled to the base. The first support member and the second support member may be disposed below the first magnetic levitation element and the second magnetic levitation element, and the first support member and the second support member may be configured to support an object.

Embodiments of the present disclosure include a carrier. The carrier generally includes a base, and a first magnetic levitation element and a second magnetic levitation element coupled to the base. The first magnetic levitation element and the second magnetic levitation element may be aligned in a first direction, the first magnetic levitation element may include a first array of features, and the second magnetic levitation element may include a second array of features. The first array of features and the second array of features may each include a ferromagnetic material, and the first array of features and the second array of features may be a linear array of features that are aligned in the first direction. The carrier may also generally include an array of legs coupled to the base and aligned in the first direction.

Embodiments of the present disclosure include a carrier. The carrier generally includes a base, and a first magnetic levitation element, a second magnetic levitation element, a third magnetic levitation element, and a fourth magnetic levitation element each coupled to the base. The first magnetic levitation element and the second magnetic levitation element may be aligned in a first direction, and the third magnetic levitation element and the fourth magnetic levitation element may be aligned in a second direction. The first direction may be at an angle to the second direction. The first magnetic levitation element may include a first array of features, the second magnetic levitation element may include a second array of features, the third magnetic levitation element may include a third array of features, and the fourth magnetic levitation element may include a fourth array of features. The first array of features, the second array of features, the third array of features, and the fourth array of features may each include a ferromagnetic material. The first array of features and the second array of features may be a first linear array of features that are aligned in the first direction, and the third array of features and the fourth array of features may be a second linear array of features that are aligned in the second direction.

BRIEF DESCRIPTION OF THE DRAWINGS

So that the manner in which the above recited features of embodiments of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 1 illustrates a top schematic view of an example substrate processing system, in which embodiments of the present disclosure may be implemented.

FIGS. 2A and 2B illustrate side views of a portion of an example station of the substrate processing system of FIG. 1, in which embodiments of the present disclosure may be implemented.

FIGS. 8A and 8B illustrate partial cross-sectional views of enlarged portions of the carrier of FIG. 6A, in accordance with embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 3A:
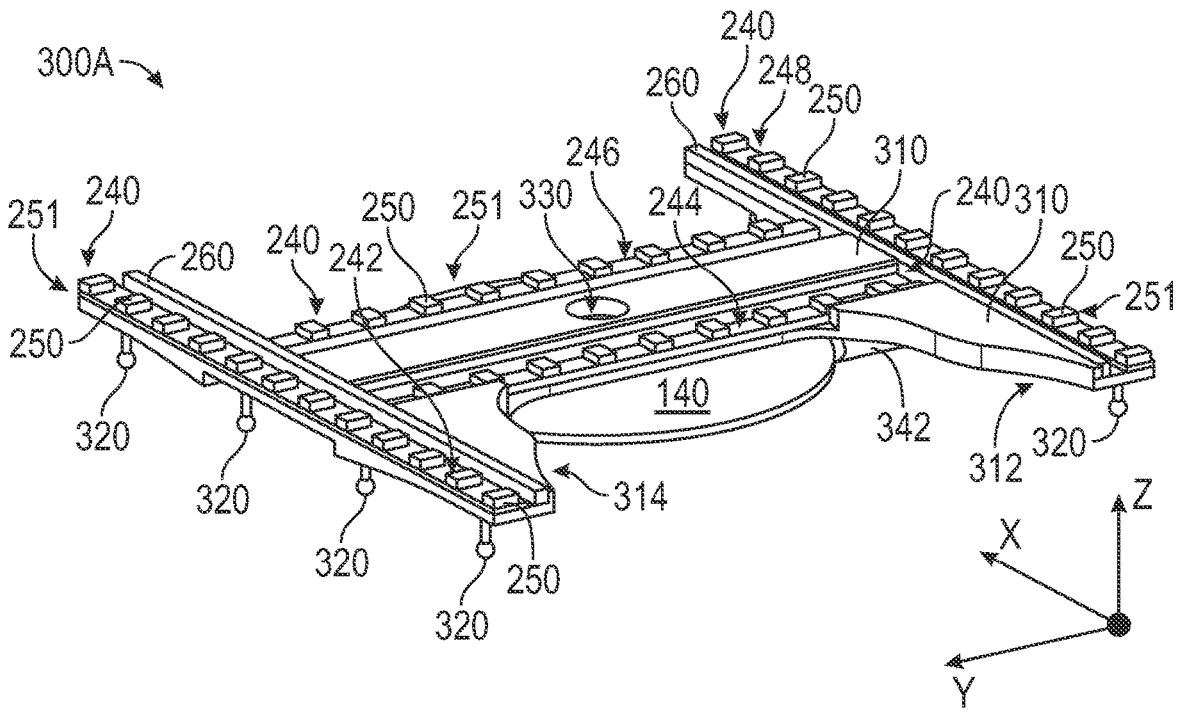
FIG. 3A illustrates an example carrier that includes a base and magnetic levitation elements, in accordance with embodiments of the present disclosure.

Embodiments of the present disclosure generally relate to substrate transfer systems, including the use of a carrier configured to support and transfer objects through a substrate processing system. In some cases, the carrier may be a semiconductor substrate carrier that is configured to transport semiconductor substrates to, within and between substrate processing chambers disposed within the substrate processing system. The carrier may include one or more rails and be configured to be magnetically levitated and transported in substrate processing systems via the one or more rails. The one or more rails may each include a plurality of features that may include, or be made of, a magnetic material. The carrier may further be formed from favorable materials and with favorable dimensions such that the carrier can reliably transport objects through the substrate processing system. In some embodiments, the carrier may be configured to be present in process chambers of the substrate processing system during processing without negatively impacting the various processing activities used in the process chambers. The carrier may also include features (e.g., supporting legs) configured to allow the carrier to handle common failures (e.g., loss of power, static charge buildup, carrier collisions) without losing transportation capability. The carrier may also be configured to carry a variety of objects, or even a plurality of objects simultaneously. Further, the carrier described herein may be configured to enable the use of sensors in the substrate processing systems to determine the presence of and the position of the carrier and/or object(s) being transported.

Substrate Processing System Example

FIG. 1 illustrates a top schematic view of an example substrate processing system 100, in which embodiments of the present disclosure may be implemented. The substrate processing system 100 includes a controller 150 and one or more processing lines 102.

The one or more processing lines 102 each include a plurality of stations, as illustrated in FIG. 1. In one example, the processing line 102 illustrated on the right side of FIG. 1 includes at least four processing stations 112, 113, 116 and 117, the processing line 102 illustrated on the left side of FIG. 1 includes at least four processing stations 112, 113, 116 and 117. However, processing stations 111, 114 and 115 may also be configured to perform one or more substrate processing processes. Each processing line 102 may include a magnetic transportation system (not shown) that include a plurality of individual magnetic levitation assemblies disposed within the stations 111-118 that are configured to convey an object 140 (FIG. 3A) disposed on a carrier 130 (FIGS. 2A-2B and 3A-3B) through the processing line 102. Each processing line 102 may be independent of other processing lines 102. The processing lines 102 may be physically separated by one another by a gap 103. The gap 103 may be sized such that a technician may walk between each processing line 102 to service the one or more stations 111-118.

Each processing line 102 may include a plurality of slit valves 160 to selectively isolate each station 111-118. The slit valves 160 may be selectively opened and closed to allow a clear path for the travel of the carrier 130, to selectively isolate the stations 111-118 from one another, and to facilitate the pressurization or depressurization of the stations 111-118.

The substrate processing system 100 may be used to process multiple substrates in each processing line 102 to produce a desired fabricated substrate. In some cases, the substrate processing system 100 may include a plurality of physical vapor deposition (PVD) processing chambers. For example, the first station 111 may be a first load lock station, the second station 112 may be a degas station, the third station 113 may be a pre-clean station, the fourth station 114 may be a routing station, the fifth station 115 may be a routing station, the sixth station 116 may be a PVD tantalum nitride deposition station, the seventh station 117 may be a PVD copper deposition station, and the eighth station 118 may be a routing station that also serves as a buffer station. An object 140 (e.g., substrate) may be transferred and processed within each process station 112-113 and 116-117. The magnitude of a vacuum within each station 111-118 may increase from station to station. For example, the magnitude of the vacuum in the seventh station 117 may exceed the magnitude of a vacuum in the other stations (e.g., stations 111-116 and 118).

The first station 111 (e.g., load lock station) may have a magnetic levitation assembly 120, which includes one or more magnetic levitation actuator assemblies 120A that include a plurality of linear stators 230 (FIG. 2B) and optionally a plurality of sensors 270. As will be discussed further below, the stations 111-118 will each typically include two or more magnetic levitation actuator assemblies 120A that are spaced apart within each of the stations 111-118 to support the carrier 130 as the carrier 130 is transferred through the station. The stations 112-113 and 116-117 (e.g., process stations) may each have a magnetic levitation assembly 120. The fourth station 114, fifth station 115, and eighth station 118 (e.g., routing stations) may each have a magnetic levitation assembly 120. The fifth station 115 may also include a plurality of shutter disks to be placed on a carrier 130 without the object 140. The shutter disks are used to receive deposition material when needed in the place of the object 140 to clean processing equipment, such as cleaning buildup found on a PVD target disposed within the PVD deposition process stations (e.g., stations 116-117). The magnetic levitation assembly 120 of the first station 111 and the magnetic levitation assembly 120 of the eighth station 118 may cooperate to change the transfer direction (e.g., X-direction to Y-direction) of the carrier 130 within the substrate processing system 100. Additionally, the magnetic levitation assembly 120 of the fourth station 114 and the magnetic levitation assembly 120 of the fifth station 115 may cooperate to change the transfer direction of travel of the carrier 130.

FIGS. 1, 2A, 2B, 3A, 3B, 4, 5A, 5B, 6A, 6B, 7A, and 7B include an X-Y-Z coordinate system to illustrate the transfer directions of the carrier 130 and object 140 through the substrate processing system 100, as well as the orientation of the carrier (e.g., carrier 130, 300A, 300B, 700A, 700B). The arrows illustrate the direction that one or more carriers 130 circulate within the processing line 102. During an example processing operation, the carrier 130 receives an object 140 entering the first station 111 in the X-direction from one or more front opening unified pods (FOUPS) 126 of a factory interface 124. The carrier 130 is then conveyed to the second station 112 in the X-direction. The first station 111 also receives the carrier 130 from the eighth station 118 in the Y-direction. After the carrier 130 is conveyed into the second station 112, the carrier 130 is conveyed to the fourth station 114 through the third station 113 in the X-direction. The carrier 130 is then conveyed from the fourth station 114 to the fifth station 115 in the Y-direction. The carrier 130 is then conveyed from the fifth station 115 to the eighth station 118 in the negative X-direction through the stations 116-117. The carrier 130 is then conveyed in the Y-direction back into the first station 111. The now fabricated object 140 is transferred back to the FOUP 126. Another object 140 may then be placed onto the carrier 130 in the first station 111 for another processing operation. A shutter disk may be conveyed on a carrier 130 from the fifth station 115 to the first station 111 in a similar manner as the object 140.

In some embodiments of the substrate processing system 100, the processing line 102 has a non-deposition portion 133 and a deposition portion 134. The non-deposition portion 133 may include a linear arrangement of stations, such as the first station 111, the second station 112, the third station 113, and the fourth station 114, that do not subject the object 140 to a process that deposits a layer on the object 140. After the object 140 passes through the non-deposition portion 133, the object 140 is conveyed into the deposition portion 134 that may be a linear arrangement of stations, such as the fifth station 115, the sixth station 116, the seventh station 117, and the eight station 118, that includes at least one station that deposits at least one layer the object. For example, the non-deposition portion 133 includes the first station 111 that is a first load lock, the second station 112 that is a degas station, the third station 113 that is a pre-clean station, and the fourth station 114 that is a routing station. The deposition portion 134 includes the fifth station 115 that is a routing station, the sixth station 116 that is a tantalum nitride deposition station, the seventh station 117 that is a copper deposition station, and the eighth station 118 that is a routing station that also serves as a buffer station.

FIGS. 2A and 2B illustrate side views of a portion 200 of an example process station (e.g., stations 112-113 and 116-117) of the substrate processing system 100 of FIG. 1, in which embodiments of the present disclosure may be implemented. The example process station, which may be the process station 112-113, 116-117 described above, may be referred to herein as simply the process station 205 for clarity. The process station 205 may be configured for contactless transportation of the carrier 130. The process station 205 may include a processing chamber that is maintained at a vacuum pressure, such that the processing region of the chamber is at a pressure that is less than 760 Torr, or even at a pressure between 1 milliTorr (mTorr) and 500 Torr. The process station 205 may be configured for contactless transportation of the carrier 130 in a vacuum chamber disposed below the processing chamber, or also referred to herein as a processing station.

The carrier 130 may be configured to carry one or more objects 140. For example, the carrier 130 may be a substrate carrier, a shutter disk carrier or a mask carrier. The carrier 130 may also be configured to transport process kit component parts. The carrier 130 may be transported in the X-direction or negative X-direction, as illustrated in FIG. 2A. The carrier 130 may also be transported in the Y-direction or negative Y-direction, as described above. In some cases, the object may be carried below the carrier 130 during transport, as illustrated in FIGS. 3A, 3B, 4, 5A, 5B, 6A, 6B, 7A, and 7B.

The carrier 130 includes one or more a magnetic levitation elements 240 that allow the carrier 130 to be levitated and transported through the process station 205. Each magnetic levitation element 240 may be a track in the X-direction or the Y-direction. The magnetic levitation element 240 may be a substantially straight magnetic levitation element 240, or may at least include one or more straight portions that allow the carrier 130 to be contactlessly transported through the substrate processing system 100. The magnetic levitation element 240 may define a transportation direction (or transport direction), along which the carrier 130 is contactlessly transported. In one example, as illustrated in FIG. 2A, the carrier 130, which includes one or more magnetic levitation elements 240, is transferred through the process station 205, and to and from other adjacent process stations 205 (not shown), by magnetic levitation, without the carrier 130 contacting the walls or components within the processing station 205.

As illustrated in FIG. 2A, the process station 205 includes a magnetic levitation assembly 120 that includes a plurality of magnetic levitation actuator assemblies 120A. The magnetic levitation actuator assemblies 120A will each include a plurality of linear stators 230. For example, a magnetic levitation actuator assembly 120A may include two or more, three or more, five or more, or 10 or more linear stators 230, depending on the desired length of the magnetic levitation elements 240, which is often referred to herein as a magnetic levitation element 240. Alternatively, the magnetic levitation actuator assemblies 120A of the magnetic levitation assembly 120 may include one elongated linear stator 230 extending along the entire length of a magnetic levitation element 240. The number of linear stators 230 shown in FIGS. 2A and 2B are examples, and a greater or lesser number of linear stators 230 may be used.

The linear stator 230 may be arranged to guide a corresponding magnetic levitation element 240 of the carrier 130, which is disposed underneath the linear stator 230. For example, a plurality of linear stators 230 may be disposed one after the other in a row, such as shown in FIG. 2A, extending in the X and/or Y-direction. The one or more linear stators 230 may be configured to remain stationary during contactless transportation of the carrier 130 along the magnetic levitation element 240 since the one or more linear stators 230 are coupled to a wall (e.g., top wall or side wall) of the process station 205.

The one or more linear stators 230 may include a plurality of stator poles 232, such as 2, 4, 6, 8 or more stator poles 232, as illustrated in FIG. 2B. The number of stator poles 232 shown in FIGS. 2A and 2B are examples, and a greater or lesser number of stator poles 232 may be used. The stator poles 232 may be protrusions, or teeth, that may project towards the carrier 130 and/or towards a magnetic levitation element 240 attached to the carrier 130. The plurality of stator poles 232 may define at least one comb structure. In some embodiments, a linear stator 230 may include two comb structures, each having a plurality of stator poles 232.

The magnetic levitation assembly 120, which includes the one or more linear stators 230, and the stator poles 232, may include, or be made of, a magnetic material, more specifically a ferromagnetic material. The magnetic material may be a non-permanent, or soft, magnetic material. The magnetic material may be a metal, such as electrical steel, silicon steel, ferritic steel, martensitic steel, or any other soft magnetic material.

The magnetic levitation element(s) 240 of the carrier 130 may include, or be made of, a magnetic material, such as a ferromagnetic material. The magnetic material may be a non-permanent, or soft, magnetic material. The magnetic material may be a metal, such as electrical steel, silicon steel, ferritic steel, martensitic steel, or any other soft magnetic material.

In some embodiments, as shown in FIG. 2A, the carrier 130 may be levitated and contactlessly transported in the X or Y-direction through the substrate processing system 100, for example when the carrier 130 is a substrate carrier for a large area substrate or a mask carrier carrying a mask for a large area substrate. The magnetic levitation element 240 is coupled to a portion of the top of the carrier 130, as illustrated. The magnetic levitation assembly 120, or at least a portion thereof, may be disposed above the carrier 130.

The carrier 130 is configured to be levitated and transported along the length of the magnetic levitation assembly 120 by use of the one or more linear stators 230 of the magnetic levitation assembly 120 that remain stationary within the process station 205. During contactless levitation and/or transportation of the carrier 130, the magnetic levitation element 240 faces at least one linear stator 230. The magnetic levitation element 240 may respectively face different linear stators 230 as the carrier 130 is transported along the magnetic levitation element 240.

Figure 3B:
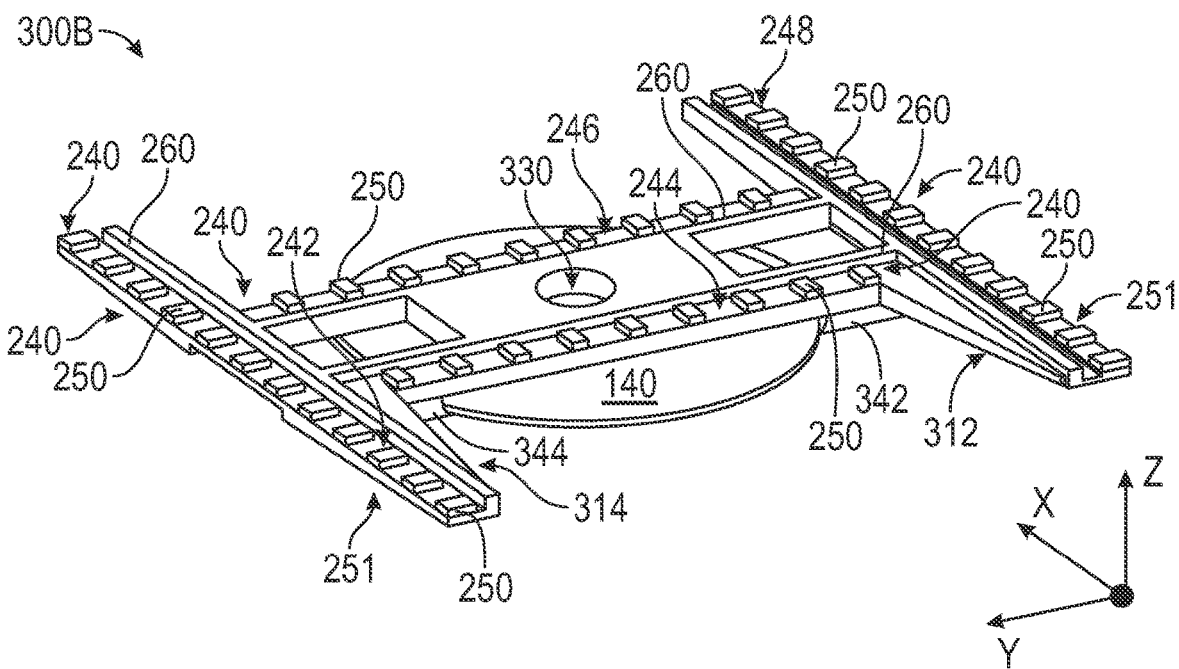
FIG. 3B illustrates an example carrier that includes magnetic levitation elements, in accordance with embodiments of the present disclosure.

The magnetic levitation element 240 may include an array of features 250. Any number of features 250 may be formed within an array of features 251. The features 250 may be protrusions, or teeth, that may project towards at least one linear stator 230 of the opposing magnetic levitation actuator assembly 120A. The raised segments of features 250, which include a magnetic material, may define a comb-like structure as illustrated in FIGS. 2B and 3A-3B. Each magnetic levitation element 240 may also include a featureless portion 260 adjacent to each array of features 250. The featureless portion 260 may span the same or part of the length of the array of features 251. The featureless portion 260 may be substantially flat (e.g., a flat surface) that the sensors 270 uses to measure and/or or detect a position of the carrier 130 during contactless levitation and/or transportation. In some embodiments, the featureless portion 260 may not be included in the carrier 130, and another portion of the carrier 130 may be to enable the sensors 270 to measure and/or or detect a position of the carrier 130. The featureless portion 260 may also be implemented by a planar surface or a non-planar surface. The featureless portion 260 may also have features of the same or varying heights.

A pitch, or spacing, may be provided between adjacent stator poles 232 of a linear stator 230. The term "adjacent stator poles" (and likewise "adjacent features 250") refers to poles of a same linear stator 230 that are adjacent to each other with respect to the direction defined by the magnetic levitation element 240, such as the transportation direction (e.g., X-direction in FIG. 2A). The pitch may be a distance, e.g. a horizontal distance, extending along the magnetic levitation element 240. Likewise, a pitch or spacing may be provided between adjacent features 250 of the magnetic levitation element 240. According to some embodiments, a first pitch between adjacent stator poles 232 of a linear stator 230 may be different from a second pitch between adjacent features 250 of the magnetic levitation element 240. Particularly, a ratio of the first pitch and the second pitch may be non-integer (the first pitch is not an integer multiple of the second pitch and the second pitch is not an integer multiple of the first pitch). The stator poles 232 of the linear stator 230 and the features 250 of the magnetic levitation element 240 may be provided according to a p/q configuration. A p/q configuration means that the distance (in the transportation direction) spanned by p consecutive adjacent stator poles 232 of the linear stator 230 includes a total of q features 250 of the magnetic levitation element 240. In some embodiments, q may be equal to p+1 or to p−1. For example, it may be the case that p=3 and q=2; or p=3 and q=4. In further examples, it may be the case that p=4 and q=3.

According to some embodiments, the one or more linear stators 230 of the magnetic levitation assembly 120 include a set of electromagnets. In light thereof, the one or more linear stators 230 are active magnetic systems that can provide an adjustable, controllable magnetic field. For example, each stator pole 232 of the linear stator 230 may include an electromagnet. The electromagnet may include a respective coil wound around each stator pole 232. Different winding schemes for winding the coils around each stator pole 232 may be provided. For example, the coils may be wound vertically, in that the coils are wound from top to bottom (clockwise) or from bottom to top (counter-clockwise). In some embodiments, the magnetic levitation element 240 may not include an electromagnet. The magnetic levitation element 240 may be a magnetically passive system, wherein the magnetic levitation element 240 is formed from a ferromagnetic material, without any electromagnets mounted thereon. In some embodiments, the magnetic levitation element 240, or at least the features 250 formed thereon, include a ferromagnetic material such as a material selected from a group comprising transition metals (e.g., iron, nickel, cobalt) and their alloys, and alloys of rare-earth metals. In one example, the magnetic levitation element 240 includes a ferritic stainless steel, such as a 409, 430 and 439 stainless steel. The magnetic levitation element 240 may also include an electrical steel, silicon steel, martensitic steel, or any other soft magnetic material.

In some embodiments, the magnetic levitation assembly 120 includes two parallel magnetic levitation actuator assemblies 120A running in the X-direction configured to levitate carrier 130 and convey the carrier 130 in either the positive or negative X-direction. The carrier 130 similarly includes two parallel magnetic levitation elements 240 running in the X-direction. Each magnetic levitation element 240 is positioned on the carrier 130 to be directly underneath the one or more linear stators 230 of a respective magnetic levitation actuator assembly 120A running in the X-direction when the carrier is being conveyed in the X-direction. Additionally, the magnetic levitation assembly 120 may also include two parallel magnetic levitation actuator assemblies 120A running in the Y-direction configured to levitate the carrier 130 and convey the carrier 130 in either the positive or negative Y-direction. The carrier 130 similarly includes two parallel magnetic levitation elements 240 running in the Y-direction. Each magnetic levitation element 240 is positioned on the carrier 130 to be directly underneath the one or more linear stators 230 of a respective magnetic levitation actuator assembly 120A running in the Y-direction when the carrier 130 is being conveyed in the Y-direction. As the carrier 130 moves in the Y-direction, the magnetic levitation elements 240 running in X-direction move out of alignment with the corresponding magnetic levitation actuator assemblies 120A running in the X-direction. The magnetic levitation actuator assemblies 120A running in the Y-direction are able to maintain levitation as the carrier 130 is moved in the Y-direction. The carrier 130 may be conveyed in the Y-direction to another station (e.g., from the fourth station 114 to the fifth station 115) until the magnetic levitation elements 240 running in the X-direction become aligned with corresponding magnetic levitation actuator assemblies 120A running in the X-direction where the carrier 130 may then be conveyed again in the X-direction.

The process station 205 may include the controller 150. The controller 150 may be connected to the set of electro-magnets of the linear stators 230 for controlling a current in the electromagnets. The current can be increased to increase the attraction force of the set of electromagnets to raise the carrier 130 or decreased to lessen the attraction force of the set of the electromagnets to lower the carrier 130.

The controller 150 as described herein may be a single centralized controller or may be a distributed controller including a plurality of individual control units. The controller 150 may include a central processing unit (CPU), a memory and, for example, support circuits. To facilitate control of the carrier 130, the CPU may be one of any form of general-purpose computer processor that can be used in an industrial setting for controlling various components and sub-processors. The memory may be coupled to the CPU. The memory, or a computer readable medium, may be one or more readily available memory devices such as random-access memory, read only memory, a floppy disk, a hard disk, or any other form of digital storage either local or remote. The support circuits may be coupled to the CPU for supporting the processor in a conventional manner. The circuits in question include cache, power supplies, clock circuits, input/output circuitry and related subsystems, and the like.

The one or more linear stators 230 including the electromagnets may, together with the magnetic levitation element 240, form a linear reluctance motor for providing both a contactless levitation and a contactless drive of the carrier 130. A linear reluctance motor is configured for providing a linear motion, or translational motion, of the carrier 130. A linear motor is distinguished from a rotary motor, which provides a rotational motion. The linear reluctance motor of the apparatus according to embodiments described herein provides a linear motion of the carrier 130 along the magnetic levitation assembly 120.

The process station 205 may include one or more sensors 270 for measuring or detecting a position of the carrier 130 during contactless levitation and/or transportation. For example, sensors 270 may be provided on opposite ends of each linear stator 230. Each sensor 270 may be configured to detect the presence of the carrier 130. Each sensor 270 may also be configured to measure a position of the carrier 130, which may include a vertical position and/or a horizontal position of the carrier 130, for example a horizontal position with respect to the transportation direction. The sensors 270 may be Hall effect based sensors, optical sensors, ultrasonic sensors, capacitive sensors, Eddy current sensors and the like. Each sensor 270 may be connected to the controller 150. The sensors 270 may also be configured to determine the presence of and/or size of an object 140 (FIG. 3A) being transported by the carrier 130. The sensors 270 may be high-precision sensors that have a sensor resolution of 100 μm or less, particularly 10 μm or less. Accordingly, the carrier 130 may be positioned vertically and/or horizontally in a target position with high precision. In some embodiments, the sensors 270 are included in the magnetic levitation assemblies 120.

The process station 205 according to embodiments described herein may include one or more sensors 270 for detecting a position of the carrier 130 with respect to a transportation direction of the carrier 130. The controller 150 may be configured to control the reluctance-based drive force in response to a signal provided by the one or more sensors 270 to position the carrier 130 in a target position with respect to the transportation direction. The reluctance-based drive force may be configured to align the carrier 130 along the magnetic levitation element 240 or transport direction. By controlling amplitude and phase angle of an AC signal provided to the coils coupled to the stator poles 232, the dynamic motion characteristics of the magnetic levitation elements 240 and thus the carrier 130, such as the amount of jerk, acceleration, velocity, and finally horizontal position can be adjusted and achieved.

In some embodiments, the substrate processing system 100 may include processing areas (e.g., areas not subject to vacuum) in the factory interface 124, and the carrier 130 may be configured to be transported through the processing areas. For example, the carrier 130 may be loaded onto the magnetic levitation assembly 120 and enter the substrate processing system 100 and be inspected in a processing area (not shown) subject to normal atmosphere before entering a load lock station (e.g., first station 111). In this manner, the magnetic levitation assembly 120 may precede the processing area and be external to the substrate processing system 100.

Carrier Configuration Examples

FIG. 3A illustrates an example carrier 300A that includes a base 310 and the magnetic levitation elements 240 of FIGS. 2A and 2B, in accordance with embodiments of the present disclosure. In some embodiments, the carrier 130 described above may be implemented as the carrier 300A. The carrier 300A of FIG. 3A may be similar to the carrier 130 of FIGS. 2A-2B, and everything discussed herein with respect to the carrier 130 may also apply to the carrier 300A.

In some embodiments, the magnetic levitation element 240 of the carrier 300A may be coupled to the base 310. The carrier 300A may include an array of legs 320 disposed below and/or coupled to the base 310 or magnetic levitation element 240. The carrier 300A may also include an opening 330 in the base 310. The carrier 300A may further include one or more substrate support members (e.g., support members 342 and 344 (not shown in FIG. 3A)) coupled to the base 310. Although the object 140 is illustrated in FIGS. 3A, 3B, 4, 6A, 6B, 7A, 7B as a substrate, the carrier 300A may also be configured to carry other objects. For example, the carrier may be configured to carry a mask, shutter, process kits parts, or other objects used in semiconductor processing, as described above. The carrier 130 may also be configured to transport shutter or process kits parts.

The magnetic levitation elements 240 of the carrier 300A may be configured to be associated with an Eigen frequency of at least 200 hertz (Hz), which relates to the inductance associated with the interaction of the magnetic fields generated by the coils within the linear stators 230 and a magnetic levitation element 240. An Eigen frequency of at least 200 Hz may enable the controller 150 of the process station 205 to more easily control the levitation and transportation of the carrier 300A and the object 140. For example, the thickness of at least a portion of the magnetic levitation element 240 together with the base 310 in the center of the carrier 300A may be at least 15-20 mm to enable the carrier 300A to have an Eigen frequency of at least 200 Hz. In some embodiments, the carrier 300A may be made out of high strength low mass materials (e.g., titanium, inconel), which may enable the thickness of at least a portion of the magnetic levitation element 240 together with the base 310 in the center of the carrier 300A to be less than 15-20 mm. The mass of the carrier 300A will affect the Eigen frequency of the carrier 300A.

In some embodiments, the magnetic levitation element 240 may include or be implemented as one or more rails (e.g., rails 242, 244, 246, 248). The rails 242, 244, 246, 248 may each be aligned in a certain direction relative to the base 310. In some cases, the magnetic levitation element 240 of the carrier 300A may include a first rail 242 aligned in a first direction (e.g., the X-direction). The magnetic levitation element 240 may also include a second rail 244 aligned in a second direction (e.g., the Y-direction). The magnetic levitation element 240 may also include a third rail 246 aligned in the Y-direction and is aligned parallel to the second rail 244. The magnetic levitation element 240 may also include a fourth rail 248 aligned in the X-direction, and is aligned parallel to the first rail 242. Although the carrier 300A in FIG. 3A is illustrated as having four rails 242, 244, 246, 248, however, any number of rails may be used in the carrier 300A. In some cases, the carrier 300A may include just the first rail 242 aligned in the X-direction and the second rail 244 aligned in the Y-direction. In some embodiments, the second rail 244 and the third rail 246 may be considered and/or implemented as a single rail.

The dimensions of the carrier 300A (including the base 310 and the rails 242, 244, 246, 248) may be based on at least one of the size of the stations 111-118, the location of the sensors 270 in the stations 111-118, or the size of the objects (e.g., the object 140) being transported by the carrier 300A. The dimensions of the carrier 300A may also be selected to facilitate the stability of the carrier 300A during transportation of the object(s) 140, as well as ensure the stability of the carrier 300A when nothing is transported. The carrier 300A may be also be configured to be large enough to support the object 140 (or multiple objects 140, as described below) and small enough to pass into, through, and out of stations (e.g., stations 111-118) of a substrate processing system (e.g., substrate processing system 100), as described above. In some cases, a ratio of a length of the carrier 300A to a length of an object (e.g., object 140) may be between 1:1 and 2:1. In some cases, the ratio of the length of the carrier 300A to the length of the object 140 may be 3:2. For example, a ratio of a length of the first rail 242 or the fourth rail 248 to a length of the object 140 may be between 1:1 and 2:1.

The following measurements are examples of carrier 300A dimensions, and this disclosure shall not be limited thereto. Although the measurements are only illustrated in FIG. 4, the measurements may be applicable to any of the Figures in this application, and may be dimensions of any carrier (e.g., carrier 130, 300A, 300B, 700A, 700B). The width A (e.g., the shortest side) of one or more of the rails 242, 244, 246, 248, such as transverse to the carrier 130 motion direction along which a magnetic levitation element 240 is aligned may be at least 40 millimeters (mm). In some configurations, the magnetic levitation elements 240 are spaced apart in a direction that is transverse to the carrier 130 motion direction by a distance B of between about 300 mm and about 500 mm. An outer edge of the second rail 244 may be at a distance C of between about 150 mm and about 600 mm from an outer edge of the third rail 246. The outer edge of the second rail 244 may be at a distance D of between about 0 mm and about 225 mm from an end of the first rail 242 and an end of the fourth rail 248. The middle of the carrier (e.g., the middle of the opening 330) may be a distance E of between about 150 mm and about 300 mm from the end of the first rail 242 and the end of the fourth rail 248. The mass of the carrier may be about 7 kilograms (kg) when not transporting the object 140, and about 13 kg when transporting the object 140. The carrier 300A may have a height (Z-direction) of less than 45 mm, a width (Y-direction) less than 600 mm, and a length (X-direction) less than 600 mm.

The features 250 may be arranged on the rails 242, 244, 246, 248. In some embodiments, a pitch and/or spacing may be provided between adjacent features 250, as described above. The features 250 may also be arrange side by side. As illustrated in FIG. 3A, the array of features 250 of the first rail 242 may be aligned in the X-direction along a surface of the first rail 242, the array of features 250 of the second rail 244 may be aligned in the Y-direction along a surface of the second rail 244, the array of features 250 of the third rail 246 may be aligned in the Y-direction along a surface of the third rail 246, and the array of features 250 of the fourth rail 248 may be aligned in the X-direction along a surface of the fourth rail 248. In some embodiments, the features 250 may be arranged linearly. A gap between each feature may vary between features 250, or may be the same along the rails 242, 244, 246, 248.

Figures 8A, 8B:
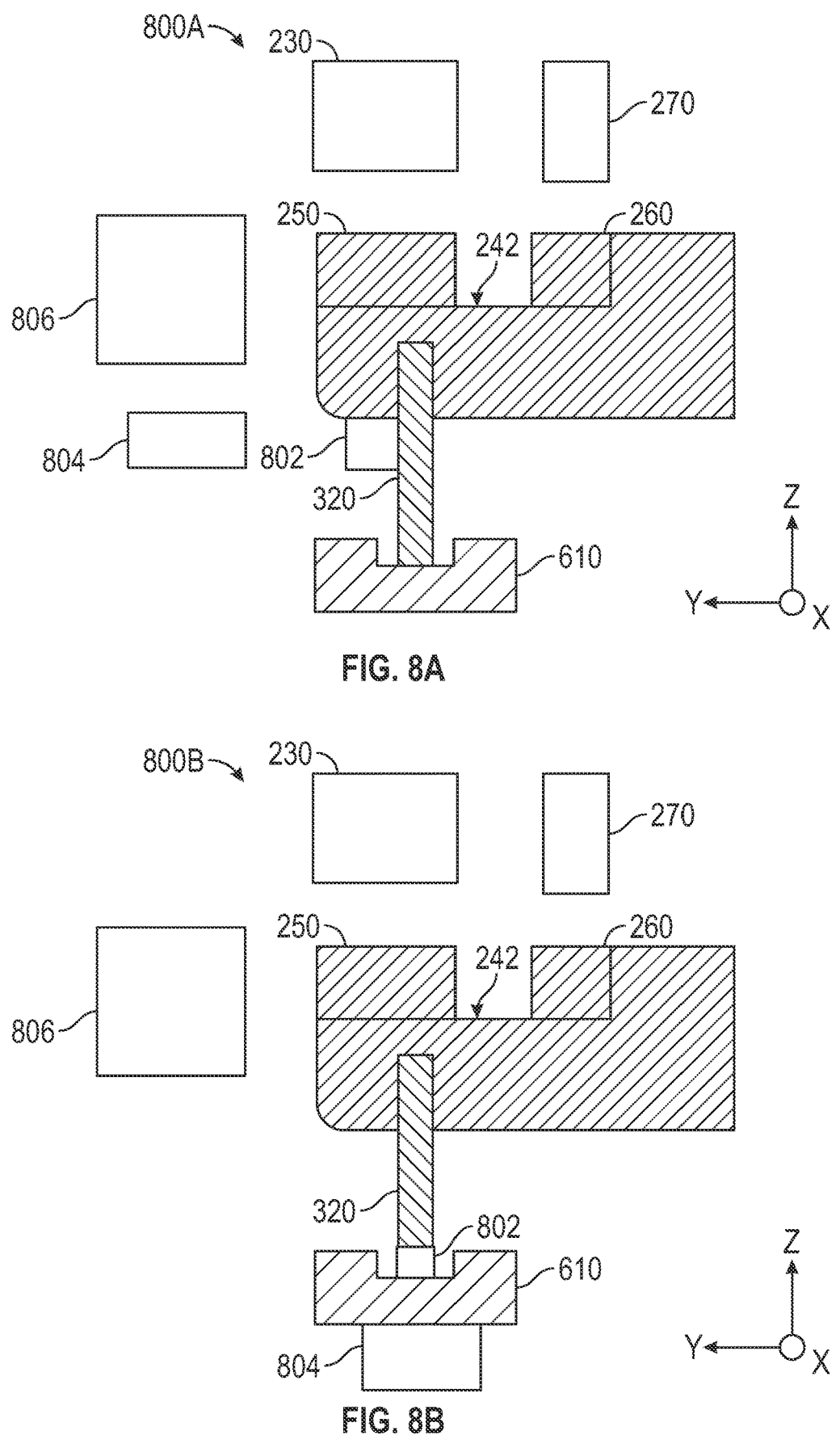

In some embodiments, the features 250 of the rails 242, 244, 246, 248 may cover a portion of the top of the carrier 130. Another featureless portion 260 of the magnetic levitation elements 240 may not include the features 250. In other words, the featureless portion 260 of the top of the carrier may not include the features 250 and thus be positioned adjacent to a portion of the magnetic levitation elements 240 that includes the features 250. The featureless portion 260 may be substantially flat (e.g., a flat surface), and configured to enable the sensors 270 to measure and/or or detect a position of the carrier 130 during contactless levitation and/or transportation, as described above. In some embodiments, the sensors 270 may be positioned above the carrier 130 to measure and/or or detect a position of the carrier 130 during contactless levitation and/or transportation, as illustrated in FIGS. 8A and 8B, which are described below. The featureless portion 260 may be included on the top of one or more of the rails 242, 244, 246, 248 of the carrier 300A, and may be implemented as a featureless track that is aligned with the array of features 250. In some embodiments, the magnetic levitation elements 240 may each include an outer portion and an inner portion. In these embodiments, the features 250 may be located on one or more outer portions of the magnetic levitation elements 240 and the featureless portion 260 may be located on one or more inner portions of the magnetic levitation elements 240, as illustrated in FIG. 3A. In some embodiments, at least a portion of the base 310 may be featureless and may be substantially flat and configured to enable the sensors 270 to measure and/or or detect a position of the carrier 130 during contactless levitation and/or transportation (e.g., FIG. 3B). That is, at least a portion of the base 310 may function as the featureless portion 260.

Figure 4:
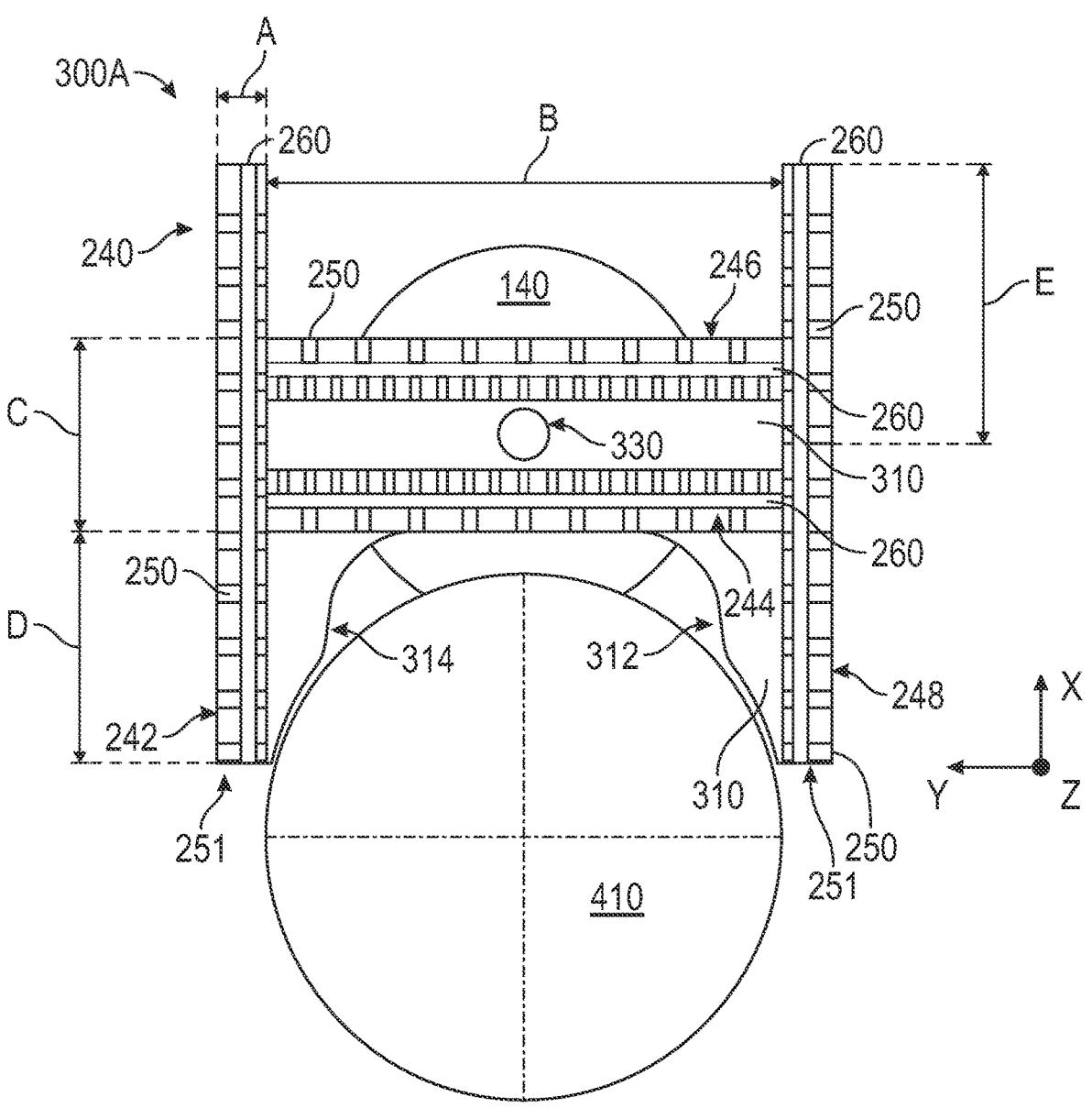
FIG. 4 illustrates a top view of the example carrier of FIG. 3A, in accordance with embodiments of the present disclosure.

During transportation, portions of the object 140 (e.g., the leading and trailing edges of the object 140) may be uncovered by the carrier 130 (e.g., as illustrated in FIG. 4), to assist in the enablement of the sensors 270 to sense the presence and/or position of the object 140. In addition, the exposed leading and trailing edges of the object 140 may enable the sensors 270 to determine the dimensions of the object 140. In some embodiments, one or more of the sensors 270 may be a drive sensor, and the carrier 130 may include a leading edge trigger (not illustrated), configured to interact with the drive sensor to alert the substrate processing system 100 of an incoming carrier. For example, the leading edge trigger may be a permanent magnet configured to trigger the drive sensor of the sensors 270 to let the substrate processing system 100 detect the leading edge of the carrier 130. The permanent magnet may be positioned in one or more of the legs 320 of the carrier 130.

As briefly discussed above, the rails 242, 244, 246, 248 may be spaced apart from each other, as illustrated in FIG. 3A. In some cases, the first rail 242 may be spaced a distance in the Y-direction from the fourth rail 248. In some cases, the second rail 244 may be spaced a distance in the X-direction from the third rail 246. In some embodiments, the carrier 130 may have a substantially symmetric shape. That is, the distance E (shown in FIG. 4) from a first end of the first rail 242 to a center of the carrier 130 may be substantially the same as the distance E from a second end of the first rail 242 (e.g., the second end being opposite to the first end) to the center of the carrier 130. For example, the carrier 300A may include the first rail 242 aligned in the X-direction, the second rail 244 aligned in the Y-direction, and the fourth rail 248 aligned in the X-direction, and the second rail 244 may have a center line extending in the Y-direction. In this example, a distance between first ends of the first rail 242 and the fourth rail 248 and the center line is substantially the same as a distance between second ends (e.g., the second ends being opposite to the first ends) of the first rail 242 and the fourth rail 248 and the center line. The stations 111-118 of the substrate processing system 100 may be configured to permit a symmetric carrier (e.g., carrier 300A) to remain in the processing station 205 during processing, without impacting processing in the processing station. For example, the processing station 205 may be large enough to accommodate the carrier 130 positioned on an end of the processing station 205 while the object 140 undergoes processing, such that the carrier 130 does not impact the processing.

In some embodiments, the carrier 300A may have an asymmetric shape. That is, the distance E (shown in FIG. 4) from a first end of the first rail 242 to the center of the carrier 130 may be different than the distance E from a second end of the first rail 242 (e.g., the second end being opposite to the first end) to the center of the carrier 130. For example, the carrier 300A may include the first rail 242 aligned in the X-direction, the second rail 244 aligned in the Y-direction, and the fourth rail 248 aligned in the X-direction, and the second rail 244 may have a center line extending in the Y-direction. In this example, a distance between first ends of the first rail 242 and the fourth rail 248 and the center line is different than a distance between second ends (e.g., the second ends being opposite to the first ends) of the first rail 242 and the fourth rail 248 and the center line. When the carrier is asymmetric, the stations 111-118 of the substrate processing system 100 may be able to be smaller than when the carrier is symmetric, as an asymmetric carrier is able to more easily remain in the processing station 205 during processing without impacting the processing.

The base 310 of the carrier 300A may be formed from a non-magnetic material and vacuum compatible material, such as metal (e.g., aluminum (Al), non-magnetic stainless steel (e.g., 316 SST) or titanium (Ti)). In some embodiments, it is beneficial to select the material from which the carrier 300A is made to include a material that can also withstand high processing temperatures. In one example, the substrate carrier 300A is made from a ceramic material (e.g., alumina, quartz, zirconia, etc.). In some cases, the substrate carrier 300A may be coated with an electrically conductive coating to resolve any charge build-up issues in the substrate carrier 300A during processing within the process station 205. In some embodiments, the rails 242, 244, 246, 248 may include a magnetic material, and the base 310 may not include a magnetic material. By using a different material in the base 310 than the rails 242, 244, 246, 248, the carrier 300A may be configured to be lighter, and/or may be cheaper to manufacture. In some embodiments, the base 310 of the carrier 300A may be formed of the same magnetic material as the rails 242, 244, 246, and 248 (e.g., each may be formed of SS430).

The carrier 300A may be configured such that a center of gravity of the carrier 300A is within 5 mm of a geometric center of the carrier 300A, regardless of whether the carrier 300A is currently transporting an object 140. This helps to ensure the stability of the carrier 300A. In some embodiments, base 310 may include at least one at least one extending feature (e.g., extending features 312, 314), as illustrated in FIGS. 3A, 4, 6A, 7A, and 7B. In some cases, the extending features 312, 314 may be configured to ensure that the center of gravity of the carrier 300A is within 5 mm of a geometric center of the carrier 300A, regardless of whether the carrier 300A is currently transporting the object 140. The extending features 312, 314 may include, or be made of, metal or ceramic.

The array of legs 320 (e.g., pegs) may be included in the carrier 300A and may be configured to support the carrier 300A. The legs 320 may be coupled to or disposed under the base 310 of the carrier 300A. The array of legs 320 may include any number of legs 320, such as an even number of legs 320. The legs 320 may be electrically coupled to one or more of the rails 242, 244, 246, 248, and may be configured to electrically ground the carrier 130. One or more of the rails 242, 244, 246, 248 may be positioned over the over the array of legs 320. In some embodiments, each rail 242, 244, 246, 248 may include at least four legs 320. In other embodiments, the array of legs 320 may be disposed only under the rails 242 248, or the rails 244 and 246. In some embodiments, the legs 320 disposed under one or more of the rails 242, 244, 246, 248 may be implemented as a continuous solid bar or structure. For example, when the array of legs is disposed only under the rails 242, 248, the array of legs 320 under each of the rails 242, 248 may be implemented as a continuous solid bar or structure instead of discrete legs.

The carrier 300A may also include the opening 330 in the base 310. The opening 330 may be configured to enable a sensor (e.g., sensors 270) to sense the presence and/or position of the object 140.

Figures 5A, 5B:
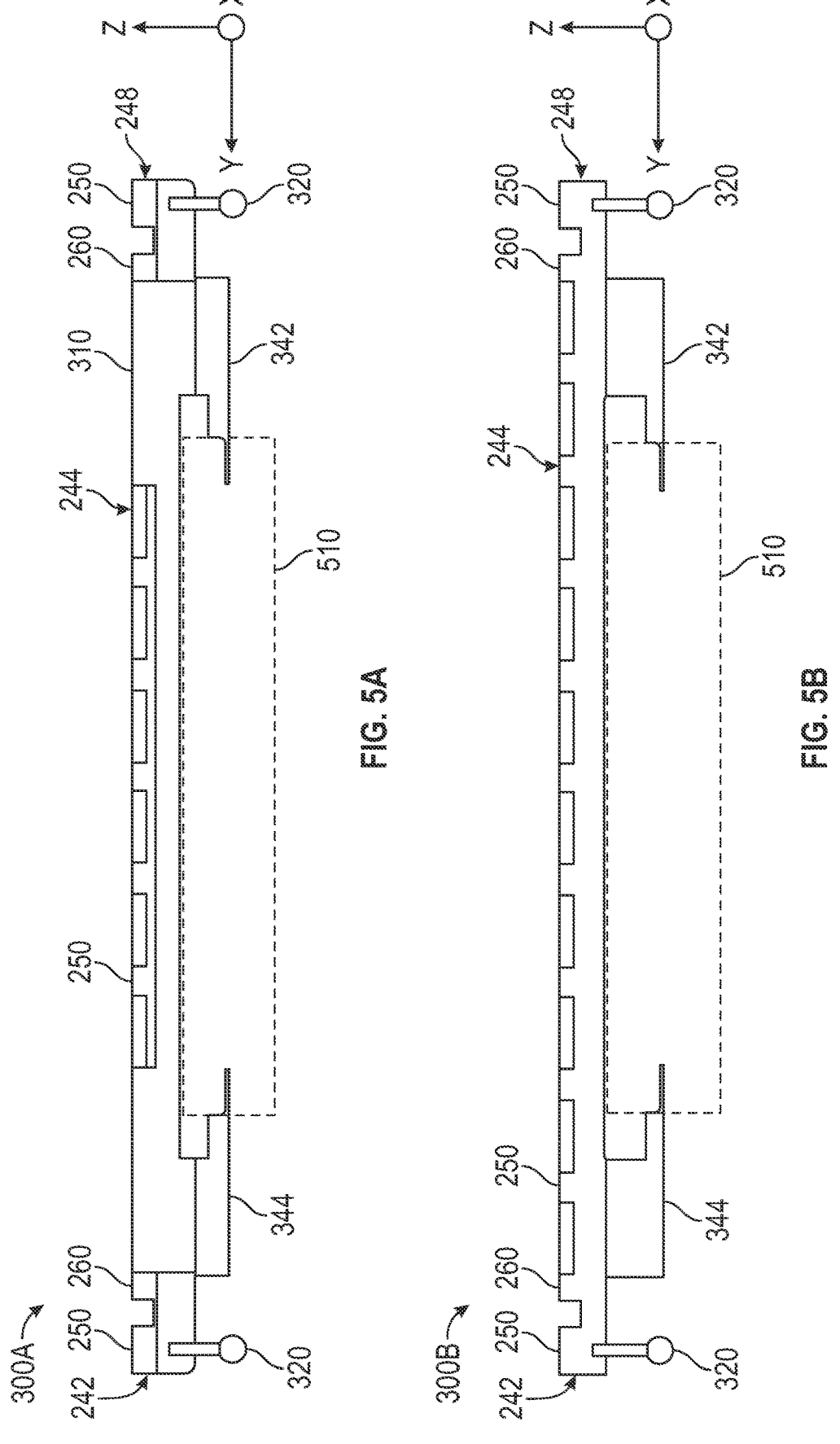
FIG. 5A illustrates a side view of the example carrier of FIG. 3A, in accordance with embodiments of the present disclosure.
FIG. 5B illustrates a side view of the example carrier of FIG. 3B, in accordance with embodiments of the present disclosure.

The support members 342, 344 of the carrier 300A may extend into a region 510 below the carrier 300A (FIG. 5A). The support members 342, 344 may be configured to support the object 140, as illustrated in FIG. 6B. In some embodiments, the support members 342, 344 may be made of a ceramic or a material that is different from the material of the base 310. The support member 342 may form a gap F (FIG. 6B) of at least 230 mm between the support member 342 and the support member 344, the gap configured to be small enough that the object 140 may rest on a portion of the support members 342, 344, as illustrated in FIG. 6B. As illustrated in FIG. 3A, the object 140 may be supported below the carrier 300A. In some embodiments, the support members 342, 344 may be implemented by a single blade coupled to one side of the base 310 that extends into the region 510, and may be configured to support the object 140.

In some embodiments, the carrier 300A may include additional support members (not shown) configured to support more than one object. For example, the carrier 300A may be configured to carry two or more objects 140 simultaneously. In this example, the carrier 300A may include a third support member and a fourth support member both configured to support an object 140.

FIG. 3B illustrates an example carrier 300B that includes the magnetic levitation elements 240 of FIGS. 2A and 2B, in accordance with embodiments of the present disclosure. In some embodiments, the carrier 130 described above may be implemented as the carrier 300B. The carrier 300B of FIG. 3B may be similar to the carrier 300A of FIG. 3A, and everything discussed herein with respect to the carrier 300A may also apply to the carrier 300B. However, in the carrier 300B, the base 310 and the magnetic levitation element 240 (including the rails 242, 244, 246, 248) each comprise magnetic material and are implemented together as one element. For example, the base 310 and rails 242, 244, 246, 248 may be implemented with the same ferromagnetic material. In these cases, the rails 242, 244, 246, 248 may be coupled to the support members 342, 344, the opening 330 may be in the rails 242, 244, 246, 248, and the extending features 312, 314 may be included in and a part of the rails 242, 244, 246, 248. Although FIG. 3B does not show the legs 320, the carrier 300B of these embodiments may include the legs 320 configured to support the carrier 300B.

FIG. 4 illustrates a top view of the example carrier 300A of FIG. 3A, in accordance with embodiments of the present disclosure. In some embodiments, the process station 205 may include a pedestal 410, as illustrated in FIG. 4. The carrier 130 (e.g., which may be implemented as carrier 300A, 300B) may be configured to transfer the object 140 to the pedestal 410 to enable the process station 205 to carry out processing on the object 140. Specifically, the carrier 130 may be configured to move to a carrier transfer position in the process station 205. The pedestal 410 may be configured to move in the Z-direction to a pedestal transfer position in the process station 205 before, during, or after the carrier 130 is moved to the carrier transfer positon. In the carrier transfer position, the carrier 130 may be configured to transfer the object 140 to the pedestal 410 while the pedestal 410 is in the pedestal transfer position. Once the object 140 is transferred to the pedestal 410, the carrier 130 may be moved to a carrier park position (e.g., the carrier park positions illustrated in FIGS. 7A and 7B). The pedestal 410 may then be raised to a process position to move the object 140 from a transport region and into a process region of the process station 205. After the process is complete, the pedestal 410 may be lowered to the pedestal transfer positon, and the carrier 130 may be configured to move to the carrier transfer position to enable the transfer of the object 140 back onto the carrier 130. The pedestal 410 may then be moved back into a lower position to enable the carrier 130 to easily exit the process station 205.

The rails 242, 244, 246, 248 may be arranged to accommodate the raising and/or lowering of the pedestal 410 through the carrier 130, in addition to being arranged to levitate the carrier 130.

FIG. 5A illustrates a side view of the example carrier 300A of FIG. 3A, in accordance with embodiments of the present disclosure. As described above, the support members 342, 344 of the carrier 300A may extend into the region 510 below the carrier 300A, and be configured to support the object 140.

FIG. 5B illustrates a side view of the example carrier 300B of FIG. 3B, in accordance with embodiments of the present disclosure. As described above, the support members 342, 344 of the carrier 300B may extend further into the region 510 below the carrier 300B, and be configured to support the object 140. In the carrier 300B, the distance between a bottom of the magnetic levitation element 240 and the support members 342, 344 may be larger than the distance between a bottom of the base 310 of the carrier 300A and the support members 342, 344. As a result, there may be more space for a larger sized object 140 to be positioned in the carrier 300B.

Figure 6A:
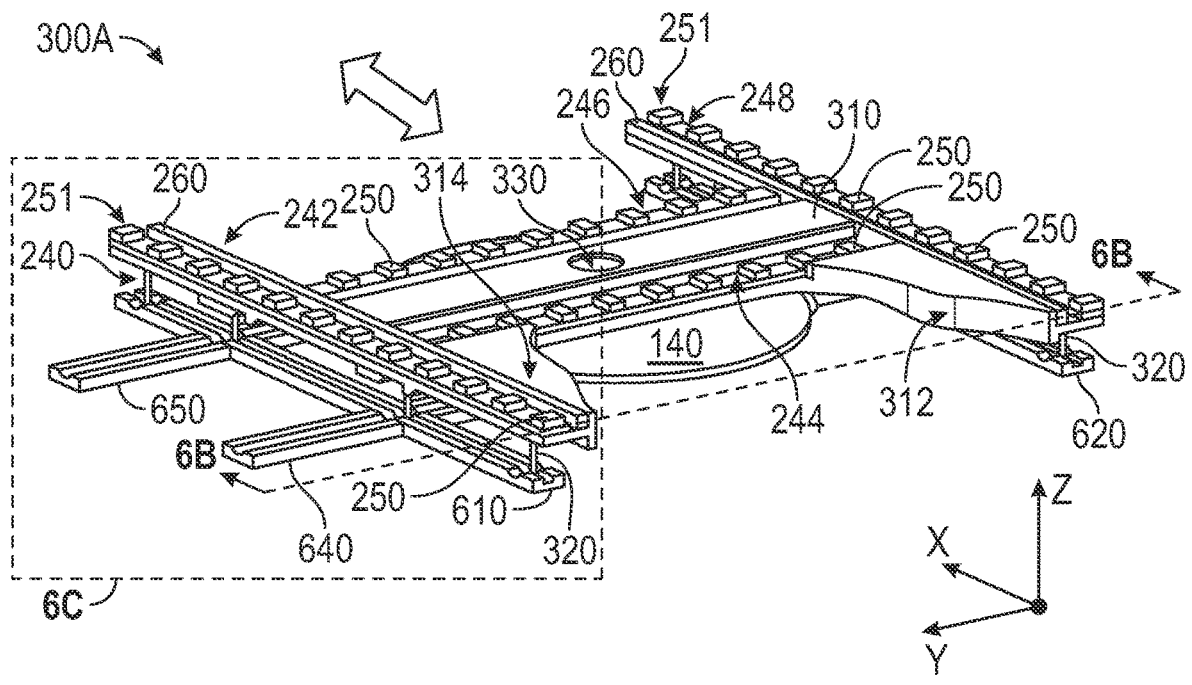
FIG. 6A is an isometric view of the carrier illustrated in FIG. 3A which includes landing rails, in accordance with embodiments of the present disclosure.
Figure 6B:
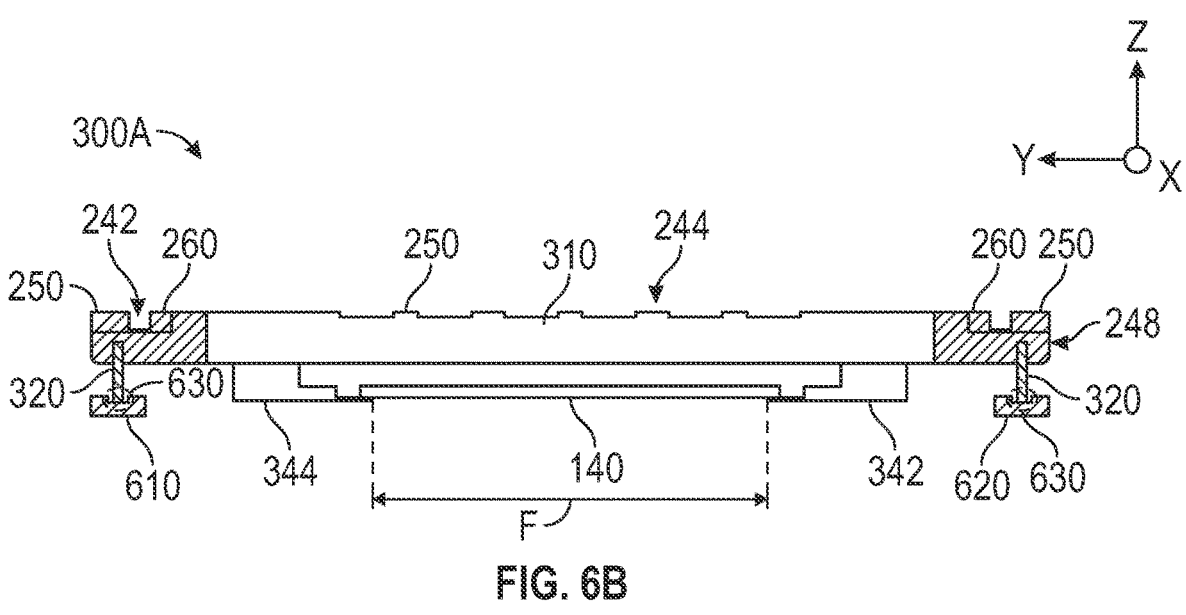
FIG. 6B illustrates a cross-sectional view taken along the section line 6B in FIG. 6A, in accordance with embodiments of the present disclosure.

FIG. 6A illustrates a view of the example carrier 300A of FIG. 3A that is interacting with landing rails 610, 620, 640, 650 disposed within the process station 205, in accordance with embodiments of the present disclosure. The landing rails 610, 620, 640, 650 may be included in a station (e.g., stations 111-118). The landing rails 610, 620, 640, 650 may be disposed in the X-direction and/or the Y-direction to enable transportation of the carrier 300A in one or both of the X-direction and the Y-direction. The array of legs 320 may be configured to contact the landing rails 610, 620, 640, 650 and support the carrier 300A when the carrier is not being levitated. For example, when levitation of the carrier 300A fails (e.g., power is lost), the carrier 300A may fall, and the legs 320 of the carrier 300A may land on the landing rails 610, 620, 640, 650. In some embodiments, the legs 320 may be configured to keep the carrier 300A upright. For example, the legs 320 may have rounded bottoms, as illustrated in FIG. 3A, configured to keep the carrier 300A upright. The legs 320 may be electrically coupled to one or more rails 242, 244, 246, 248 and may be configured to electrically ground the carrier 300A through the landing rails 610, 620, 640, 650, as described above. For example, in the case of static charge buildup in the carrier 300A, the carrier 300A may be positioned on the landing rails 610, 620, 640, 650 by adjusting the power provided to the stators 230 to allow the legs 320 to contact the landing rails 610, 620, 640, 650 to ground the carrier 300A. The design of the legs 320 are configured to enable the carrier 300A to stay upright after the carrier 300A lands on the landing rails 610, 620, 640, 650 but also doesn't allow the carrier 300A to be positioned or separated vertically too far from the stators 230 so that the carrier 300A can be levitated (e.g., picked-up) and transported again by the stators 230 in the magnetic levitation assembly 120. In some embodiments, one or more of the landing rails 610, 620, 640, 650 may be implemented as discrete landing points, instead of continuous rails.

FIG. 6B illustrates a cross-sectional view taken along the section line 6B in FIG. 6A, in accordance with embodiments of the present disclosure. In some embodiments, the landing rails 610, 620, 640, 650 may include a landing profile 630, as illustrated in FIG. 6B. The landing profile 630 of the landing rails 610, 620 is configured to receive the legs 320 of the carrier 300A and configured to enable the carrier 300A to be able to regain levitation. For example, the landing profile may permit the legs 320 to shift vertically a maximum of about 2 mm after landing on the landing rails 610, 620, 640, 650. In addition, the landing profile 630 may permit the legs 320 to shift horizontally (along the Y-axis) a maximum of about +2.5 mm after landing on the landing rails 610, 620, 640, 650.

Figure 6C:
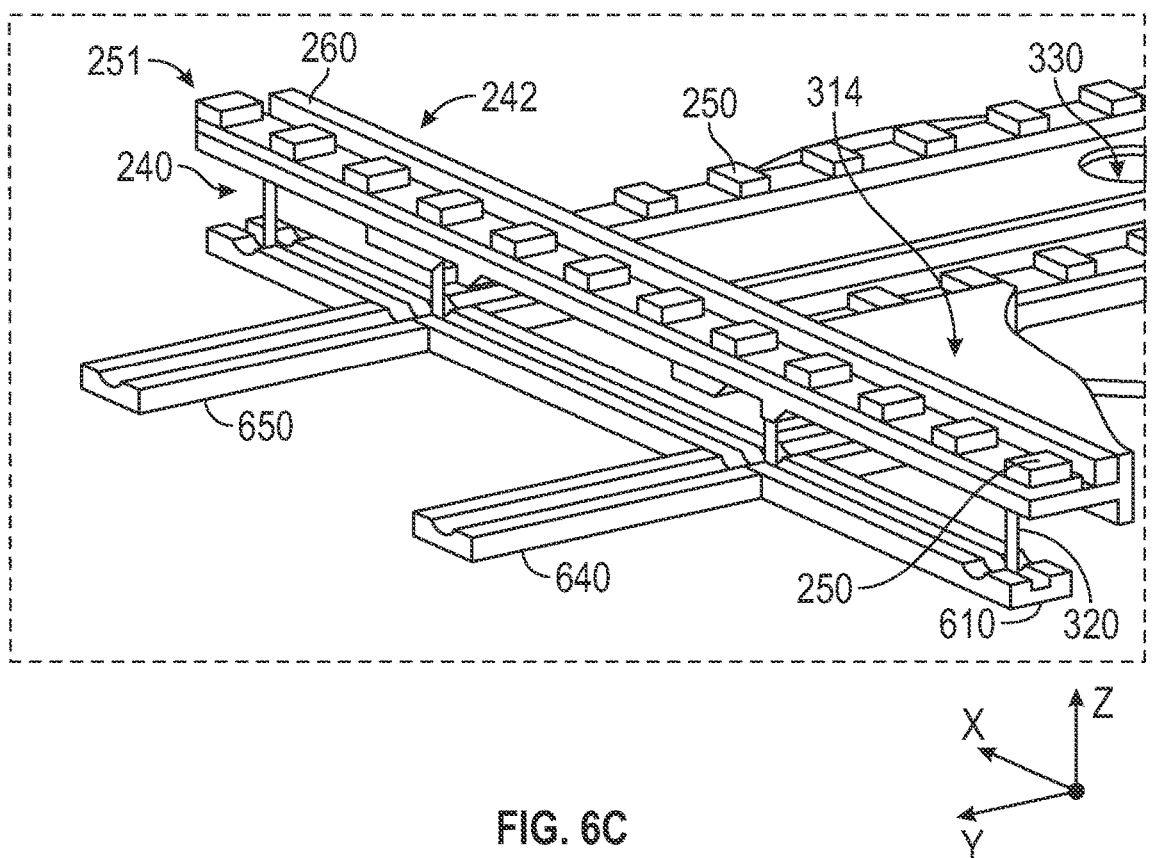
FIG. 6C illustrates an enlarged top side isometric view taken from FIG. 6A, in accordance with embodiments of the present disclosure.

FIG. 6C illustrates an enlarged top side view taken from FIG. 6A. Depending on the direction that the carrier 300A is travelling, the landing rails 610, 620, 640, 650 may be positioned to support the carrier 300A. For example, a set of landing rails 610, 620 may be disposed in the X-direction and a set of landing rails 640, 650 may be disposed in the Y-direction to enable transportation of the carrier 300A in one or both of the X-direction and the Y-direction, as illustrated in FIG. 6C.

Figures 7A, 7B:
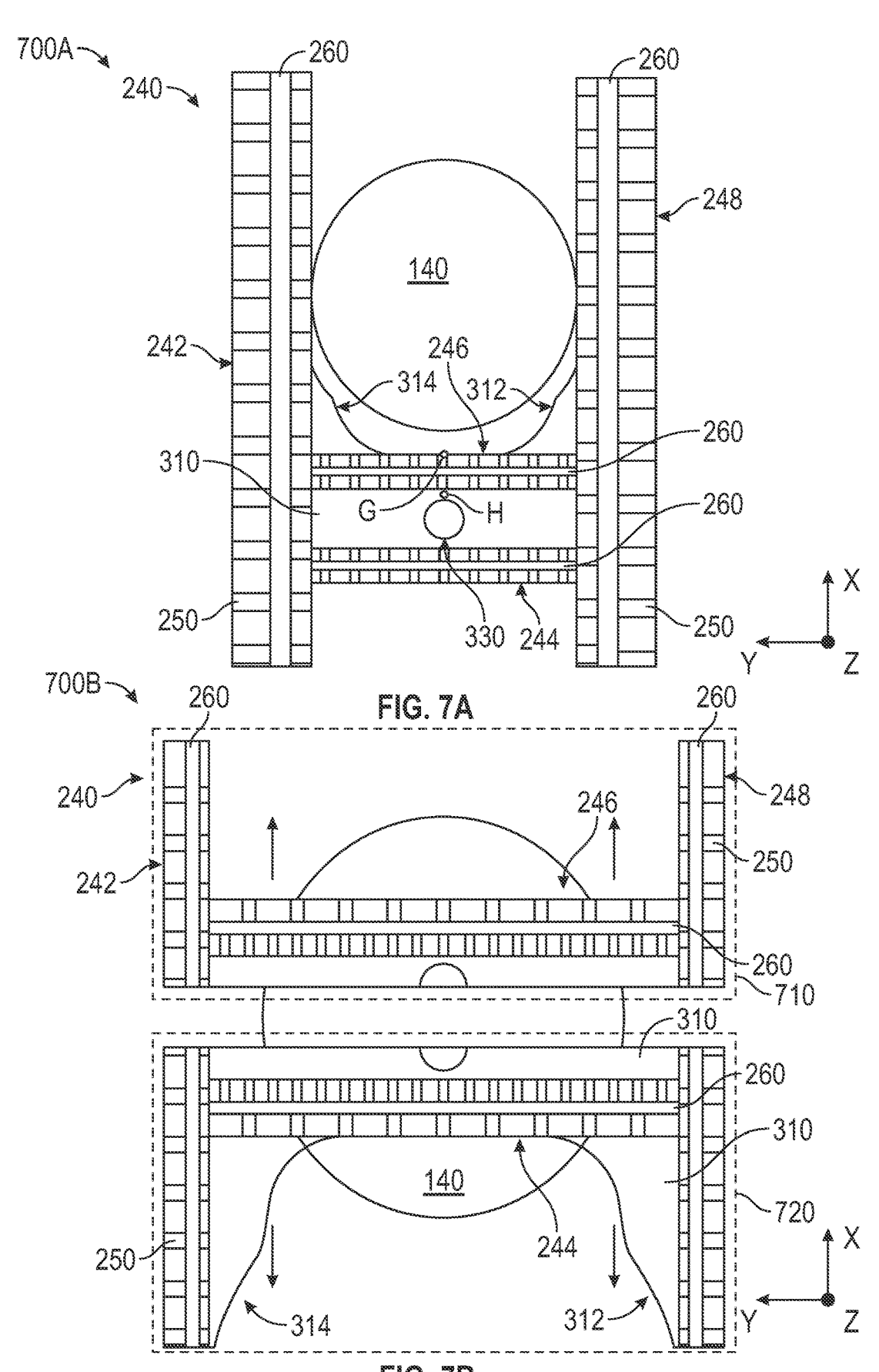
FIG. 7A illustrates a top view of an example carrier in a process position, in accordance with embodiments of the present disclosure.
FIG. 7B illustrates a top view of an example carrier configured to split apart in a process position, in accordance with embodiments of the present disclosure.

FIG. 7A illustrates a top view an example carrier 700A in a process position, in accordance with embodiments of the present disclosure. In some embodiments, the carrier 130 described above may be implemented as the carrier 700A. The carrier 700A of FIG. 7A may be similar to the carrier 300A of FIG. 3A and/or the carrier 300B of FIG. 3B, and everything discussed herein with respect to the carrier 300A and the carrier 300B may also apply to the carrier 700A. However, the carrier 700A may be asymmetric in one or more directions (e.g., X-direction), as described herein and illustrated in FIG. 7A. The carrier 700A may be configured such that the carrier 700A may be positioned off to one side (e.g., in the carrier park position) of the process station 205 and therefore able to remain in the process station 205 during processing without negatively impacting the processing of the object 140. For example, the carrier 700A may include the first rail 242 aligned in the X-direction, the second rail 244 aligned in the Y-direction, and the third rail 246 aligned in the Y-direction, and the fourth rail 248 aligned in the X-direction, and the second rail 244 may have a center line extending in the Y-direction. In this example, a distance between first ends of the first rail 242 and the fourth rail 248 and the center line is different than a distance between second ends (e.g., the second ends being opposite to the first ends) of the first rail 242 and the fourth rail 248 and the center line.

As a result of the asymmetric shape of the carrier 700A, a center of gravity G of the carrier 700A may be different than a geometric center H (FIG. 7A) of the carrier 700A, which may affect the levitation and transport of the carrier 700A. As such, the magnetic levitation element 240 (including the rails 242, 244, 246, 248) in asymmetric carriers may be configured to compensate for the instability introduced by the differences between the center of gravity G and geometric center H of the asymmetric carriers. For example, when the difference between the center of gravity and the geometric center is larger, the pitch/spacing provided between the features 250 may be smaller. In some cases, when the carrier 700A is transporting the object 140, the center of gravity G may be offset from the geometric center H of the carrier 700A as a result of the weight of the object 140, as illustrated in FIG. 7A.

FIG. 7B illustrates a top view of an example carrier 700B configured to split apart in a process position, in accordance with embodiments of the present disclosure. In some embodiments, the carrier 130 described above may be implemented as the carrier 700B. The carrier 700B of FIG. 7B may be similar to the carrier 300A of FIG. 3A and/or the carrier 300B of FIG. 3B, and everything discussed herein with respect to the carrier 300A and the carrier 300B may also apply to the carrier 700B. However, a first part 710 of the carrier 700B may be configured to split apart from a second part 720 of the carrier 700B when the carrier 700B is in the carrier park position. As such, the first part 710 and the second part 720 of the carrier 700A may each be positioned off to opposite sides of a station (e.g., process station 205) in the carrier park positions by use of the linear stators 230 in two separate portions of the chamber, enabling both parts of the carrier 700B to remain in the process station 205 during processing without negatively impacting the processing of the object 140. FIG. 7B illustrates the first part 710 and the second part 720 of the carrier 700B beginning to move apart. In some embodiments, the first part 710 and the second part 720 of the carrier 700B may be able to move in the same direction and be positioned on the same side a station in the carrier park position. In order to keep the two separate portions together so that an object can be reliably transferred by the carrier 700B, the leading portion of the carrier 700B may be urged in the transfer direction due to a contact force created by the trailing portion of the carrier 700B bearing against a surface of the leading portion. The coordination of the movement and separation of the leading and trailing portions of the carrier 700B is performed by the use of controller 150, which coordinates the movement and forces applied to each of the portions by the stators 230.

FIGS. 8A and 8B illustrate partial cross-sectional views of enlarged portions 800A, 800B of the carrier 300A of FIG. 6A. In some embodiments, the one or more magnetic levitation actuator assemblies 120A may further include a magnetic actuator 806 configured to interact with material included in the carrier 300A and adjust the position of the carrier 300A in the Y-direction. For example, the magnetic actuator 806 may be configured to interact the magnetic levitation element 240 and/or the features 250 thereof, and the magnetic actuator 806 may be used to move the carrier 300A to align the center of the object 140 (and the carrier 300A) with the center of a process station (e.g., process station 205).

In some embodiments, the portion 800B of the carrier 300A may include one or more magnetic elements 802. The one or more magnetic elements 802 may be configured to be measured and/or detected by the plurality of sensors 270. In some cases, the one or more magnetic elements 802 may be located on the underside of the carrier 300A, as illustrated in FIG. 8A. In other cases, the one or more magnetic elements 802 may be located on the bottom of one or more of the legs 320 of the carrier 300A, as illustrated in FIG. 8B. In some cases, the one or more magnetic elements 802 may be located on both the underside of the carrier 300A and at least one leg 320 of the carrier 300A.

As described above, the sensors 270 may be configured to measure and/or detect a position of the carrier 300A. For example, the sensors 270 may be positioned as illustrated in FIGS. 8A and 8B and be configured to measure the position of the carrier 300A in the Z-direction. The plurality of sensors 270 may include one or more position sensors 804 configured to interact with the one or more magnetic elements 802 to facilitate the measurement and/or detection of the position of the carrier 300A in the Y-direction. In some cases, one or more position sensors 804 may be located on the side of the process chamber 205, as illustrated in FIG. 8A. In other cases, the one or more position sensors 804 may be included in the landing rails 610, 620, 640, 650 or located underneath landing rails 610, 620, 640, 650, as illustrated in FIG. 8B. In some cases, the one or more position sensors 804 may be located on both the side of the processing chamber 205 and included in or underneath the landing rails 610, 620, 640, 650.

Figure 9:
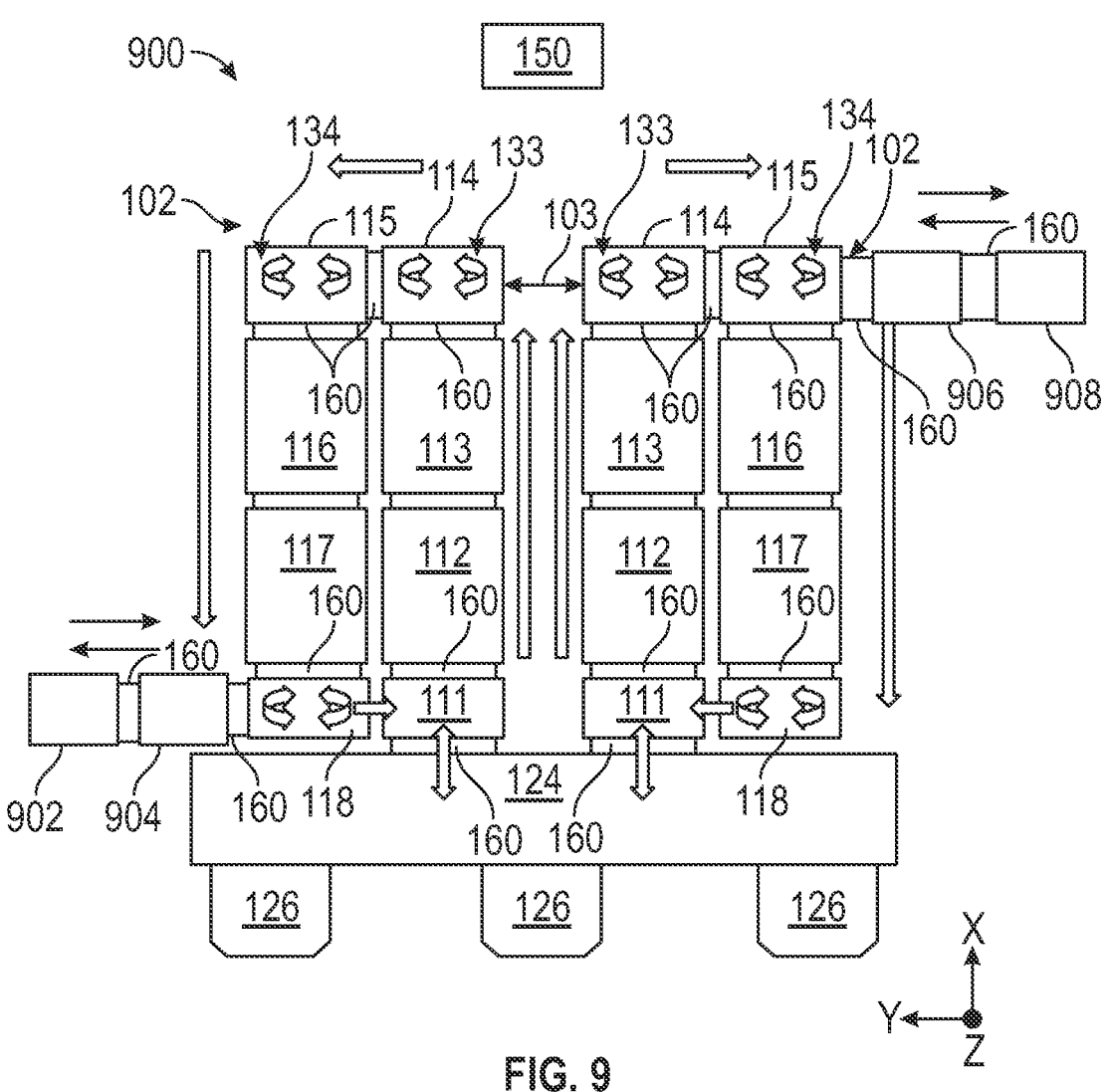
FIG. 9 illustrates a top schematic view of an example substrate processing system with additional stations, in which embodiments of the present disclosure may be implemented.

FIG. 9 illustrates a top schematic view of an example substrate processing system 900 with additional stations 902, 904, 906, 908, in which embodiments of the present disclosure may be implemented. The substrate processing system 900 may be similar to the substrate processing system 100, but includes the additional stations 902, 904, 906, 908. Although four additional stations are shown coupled to process stations 115, 118, additional stations may be coupled to any of the stations 111-118, and any number of additional stations may be utilized.

The additional stations 902, 904, 906, 908 may be implemented as processing stations, routing stations, load lock stations, degas stations, or any combination thereof. In some cases, one or more of the additional stations 902, 904, 906, 908 may enable the insertion of additional carriers 130 into the substrate processing system 900. For example, stations 902 and 904 may be load lock stations and stations 904, 908 may be degas stations, such that a carrier 130 conveying the object 140 may enter the substrate processing system 900 at processing stations 114, 118 while minimizing the interruption of the existing flow of carriers 130 in the substrate processing system 900.

The additional stations 902, 904, 906, 908 may also be implemented as access stations configured to allow the removal of a carrier 130 from the one or more processing lines 102. For example, when an object 140 is determined to have a defect, the carrier 130 conveying the object 140 may be routed to an access station (e.g., stations 906, 908 implemented as access stations) without returning to the FOUPS 126 to minimize the impact of the defect on the operation of the substrate processing system 900. In another example, when a carrier 130 is malfunctioning, the carrier 130 may be routed to an access station (e.g., stations 906, 908 implemented as access stations) without returning to FOUPS 126 to minimize the impact of the malfunction on the operation of the substrate processing system 900.

In some embodiments, the carriers described herein may include one or more carrier identification features (not illustrated). A sensor (e.g., sensor 270) may be able to detect and identify a configuration, type, and/or performance of the carrier using the carrier identification feature. For example, some carriers may behave differently as a result of slight variations in the mechanical or magnetic performance of the carrier, and a substrate processing system (e.g., substrate processing system 100) may need to operate differently to ensure desired carrier performance. The one or more carrier identification features may be implemented as magnetic elements, an RFID tag, a mark, or any other identifiable features.

ADDITIONAL CONSIDERATIONS

In the above description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure. As used herein, the term "about" may refer to a +/−10% variation from the nominal value. It is to be understood that such a variation can be included in any value provided herein.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "coupled" is used to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object.

While the foregoing is directed to embodiments of the present disclosure, other and further embodiments of the disclosure may be devised without departing from the basic scope thereof, and the scope thereof is determined by the claims that follow.

What is claimed is:

1. A carrier, comprising:

a base;

a first magnetic levitation element and a second magnetic levitation element coupled to the base, wherein the first magnetic levitation element and the second magnetic levitation element are aligned in a first direction, wherein the first magnetic levitation element comprises a first rail that comprises a first array of features and the second magnetic levitation element comprises a second rail that comprises a second array of features, the first array of features and the second array of features each comprising a ferromagnetic material, and wherein the first array of features and the second array of features are a linear array of features that are aligned in the first direction;

a third rail disposed on the base and aligned in a second direction, wherein the third rail comprises a third array of features, the third array of features comprising magnetic material, wherein the third array of features are aligned in the second direction, and wherein the first direction is at an angle to the second direction;

a first support member coupled to the base; and a second support member coupled to the base, wherein the first support member and the second support member are disposed below the first magnetic levitation element and the second magnetic levitation element, and wherein the first support member and the second support member are configured to support an object.

2. The carrier of claim 1, wherein:

the first rail is spaced apart in the second direction from the second rail;

the first rail and the second rail each comprise a first end and a second end;

the third rail has a center line that extends in the second direction; and a distance between the first ends of the first rail and the second rail and the center line is greater than a distance between the second ends of the first rail and the second rail and the center line.

3. The carrier of claim 1, wherein the first rail extends in the first direction between a first end and a second end and the second rail extends in the first direction between a first end and a second end, the first array of features are formed on a first portion of the first rail, the second array of features are formed on a first portion of the second rail, the first rail and the second rail each further comprise a second portion that does not include the arrays of features, and the second portions extend in the first direction between the first end and the second end of the first rail and the second rail.

4. The carrier of claim 1, wherein the first rail, the second rail, and the base comprise a ferromagnetic material.

5. The carrier of claim 1, wherein the first rail and the second rail comprise a ferromagnetic material, and wherein the base does not comprise a ferromagnetic material.

6. The carrier of claim 1, further comprising an array of legs that are coupled to the base, wherein the array of legs are aligned in the first direction.

7. The carrier of claim 6, wherein:

the array of legs are electrically coupled to at least one of the first rail or the second rail; and the array of legs are configured to electrically ground the carrier.

8. The carrier of claim 7, wherein at least one of the first rail or the second rail is positioned over the array of legs.

9. The carrier of claim 1, wherein the base comprises a ceramic material or a metal.

10. The carrier of claim 1, wherein the first rail extends in the first direction between a first end and a second end and the second rail extends in the first direction between a first end and a second end, and a ratio of a length of the first rail or the second rail to a length of the object in the first direction during a process of transporting the object is between 1:1 and 2:1.

11. The carrier of claim 1, wherein the carrier further comprises a first portion and a second portion, and the first portion is configured to be separated from the second portion of the carrier.

12. A carrier, comprising:

a base;

a first magnetic levitation element and a second magnetic levitation element coupled to the base, wherein the first magnetic levitation element and the second magnetic levitation element are aligned in a first direction, wherein the first magnetic levitation element comprises a first array of features and the second magnetic levitation element comprises a second array of features, the first array of features and the second array of features each comprising a ferromagnetic material, and wherein the first array of features and the second array of features are a linear array of features that are aligned in the first direction; and an array of legs coupled to the base and aligned in the first direction.

13. The carrier of claim 12, further comprising a third magnetic levitation element disposed on the base and aligned in a second direction, wherein the third magnetic levitation element comprises a third array of features, the third array of features comprising a ferromagnetic material, wherein the third array of features is aligned in the second direction, and wherein the first direction is at an angle to the second direction.

14. The carrier of claim 12, wherein the first magnetic levitation element comprises a first rail that comprises the first array of features and the second magnetic levitation element comprises a second rail that comprises the second array of features.

15. A carrier, comprising:

a base; and a first magnetic levitation element, a second magnetic levitation element, a third magnetic levitation element, and a fourth magnetic levitation element each coupled to the base, wherein the first magnetic levitation element and the second magnetic levitation element are aligned in a first direction, wherein the third magnetic levitation element and the fourth magnetic levitation element are aligned in a second direction, wherein the first direction is at an angle to the second direction, wherein the first magnetic levitation element comprises a first array of features, the second magnetic levitation element comprises a second array of features, the third magnetic levitation element comprises a third array of features, the fourth magnetic levitation element comprises a fourth array of features, wherein the first array of features, the second array of features, the third array of features, and the fourth array of features each comprise a ferromagnetic material, wherein the first array of features and the second array of features are a first linear array of features that are aligned in the first direction, and wherein the third array of features and the fourth array of features are a second linear array of features that are aligned in the second direction.

16. The carrier of claim 15, further comprising:

a first support member coupled to the base; and a second support member coupled to the base, wherein the first support member and the second support member are disposed below the first magnetic levitation element, the second magnetic levitation element, the third magnetic levitation element, and the fourth magnetic levitation element, and wherein the first support member and the second support member are configured to support an object.

17. The carrier of claim 15, wherein the first magnetic levitation element comprises a first rail that comprises the first array of features, the second magnetic levitation element comprises a second rail that comprises the second array of features, the third magnetic levitation element comprises a third rail that comprises the third array of features, and the fourth magnetic levitation element comprises a fourth rail that comprises the fourth array of features.

18. The carrier of claim 17, wherein the first rail, the second rail, the third rail, and the fourth rail comprise a ferromagnetic material, and wherein the base does not comprise a ferromagnetic material.

* * * * *